US00RE40024E

(19) United States
(12) Reissued Patent
Hill

(10) Patent Number: US RE40,024 E
(45) Date of Reissued Patent: Jan. 22, 2008

(54) PARTIAL PRINTING OF A SUBSTRATE WITH EDGE SEALED PRINTED PORTIONS

(75) Inventor: G. Roland Hill, Stockport (GB)

(73) Assignee: Contra Vision Ltd., Cheshire (GB)

(21) Appl. No.: 11/034,445

(22) Filed: Jan. 13, 2005

Related U.S. Patent Documents

Reissue of:
(64) Patent No.: 6,506,475
Issued: Jan. 14, 2003
Appl. No.: 09/764,276
Filed: Jan. 19, 2001

(51) Int. Cl.
*B32B 23/02* (2006.01)

(52) U.S. Cl. ..... 428/194; 428/195.1; 428/187; 156/107

(58) Field of Classification Search ..... 428/195.1, 428/194, 187; 156/107
See application file for complete search history.

(56) References Cited

U.S. PATENT DOCUMENTS

| | | | |
|---|---|---|---|
| 4,321,778 | A | 3/1982 | Whitehead |
| 4,925,705 | A | 5/1990 | Hill |
| 5,281,499 | A | 1/1994 | Bussard |
| 5,830,529 | A | 11/1998 | Ross |
| 6,210,776 | B1 | 4/2001 | Hill |
| 6,212,805 | B1 | 4/2001 | Hill |
| RE37,186 | E | 5/2001 | Hill |
| 6,267,052 | B1 | 7/2001 | Hill et al. |
| 6,506,475 | B1 | 1/2003 | Hill |
| 6,507,413 | B1 | 1/2003 | Mueller |

FOREIGN PATENT DOCUMENTS

| | | |
|---|---|---|
| DE | 212 3437 A | 2/1972 |
| EP | 008 5732 A | 8/1983 |
| GB | 2 118 096 | 4/1986 |
| GB | 2 188 873 | 10/1987 |
| JP | 14101 | 1/1982 |
| WO | WO 97/47481 | 12/1997 |
| WO | WO 00/46043 | 8/2000 |

*Primary Examiner*—Rena Dye
*Assistant Examiner*—Tamra L. Dicus
(74) *Attorney, Agent, or Firm*—Pillsbury Winthrop Shaw Pittman LLP

(57) ABSTRACT

This invention relates to the partial printing of a substrate with a plurality of layers to form a partially printed panel. Within each printed portion, at least one layer is applied to the substrate with inexact registration in relation to a second layer. A "control layer" comprising "edge sealing strips" is printed so that, within each printed portion, each edge of the at least two layers with inexact registration is located within the edges of an overlapping edge sealing strip. The edge sealing strips may provide a visual seal or mask at the edges of printed portions, for example to enable the each printed portion to have the desired color rendering within a one-way vision control panel. The invention can comprise the physical sealing of printed portions containing gaseous or liquid fluids or particles in suspension, such as fragrances, medication, environmentally reactive materials or security printing features.

38 Claims, 29 Drawing Sheets

Figure 1A:
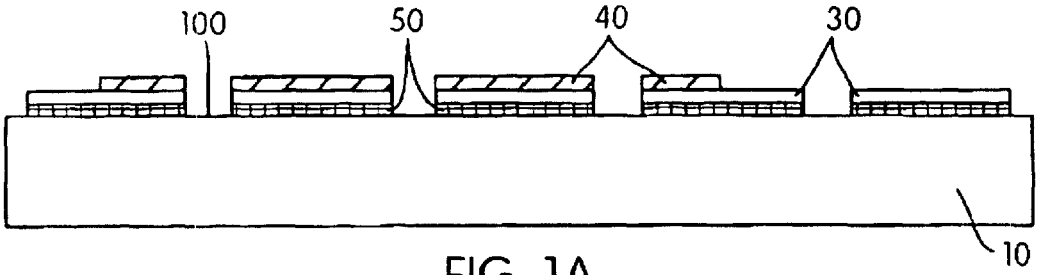
FIG. 1A PRIOR ART

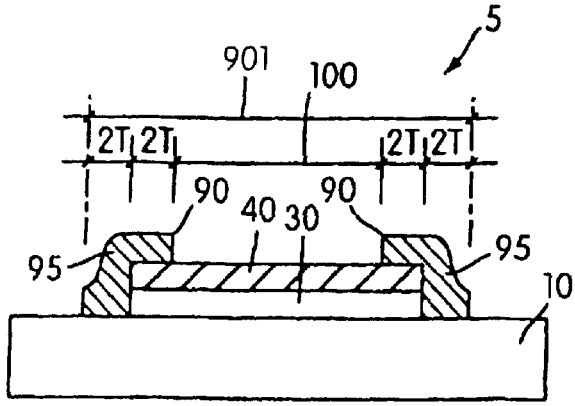
FIG. 8A
(Amended)

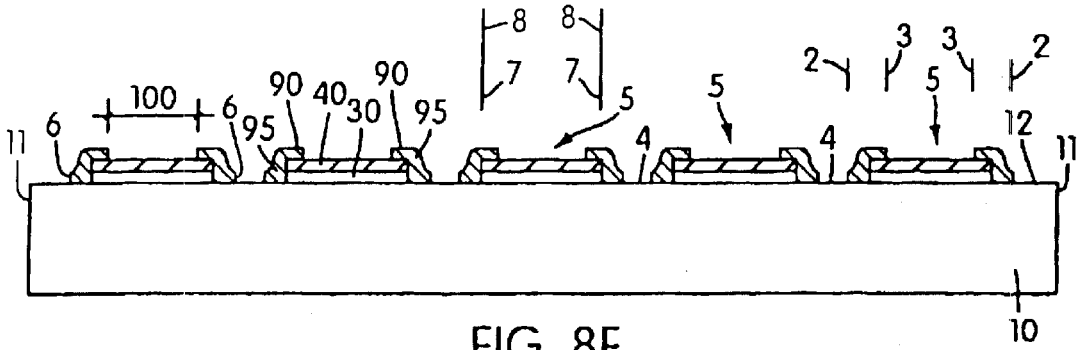
FIG. 8E
(Amended)
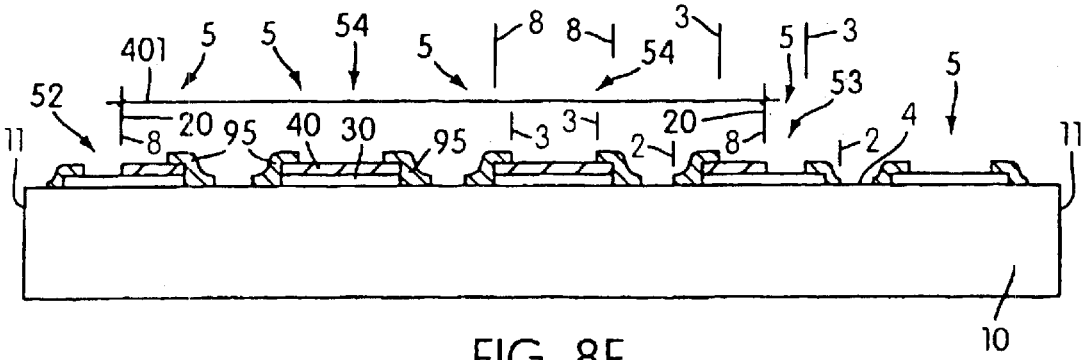
FIG. 8F
(Amended)

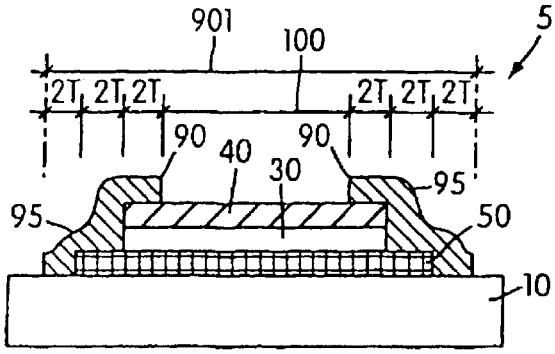
FIG. 9G
(Amended)

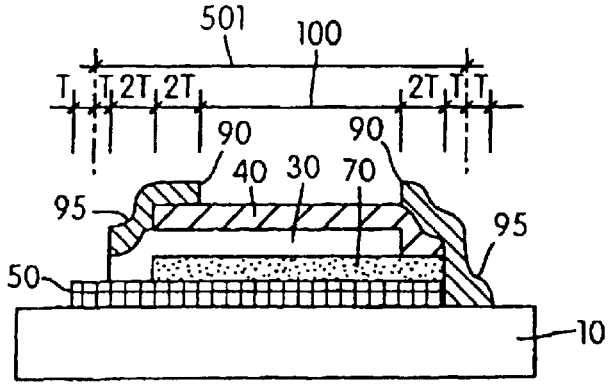
FIG. 10B
(Amended)

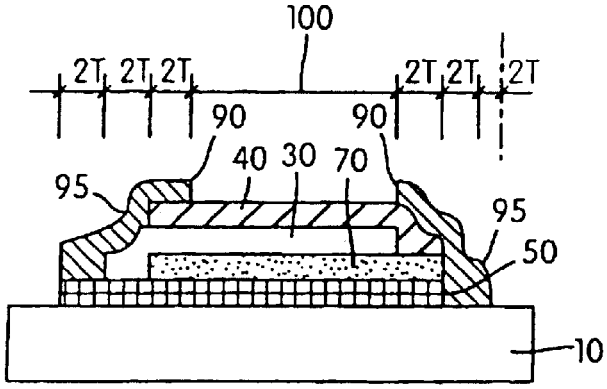
FIG. 10H
(Amended)

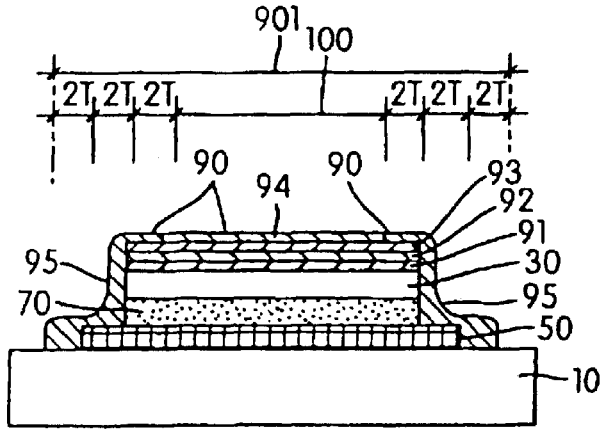
FIG. 11C
(Amended)

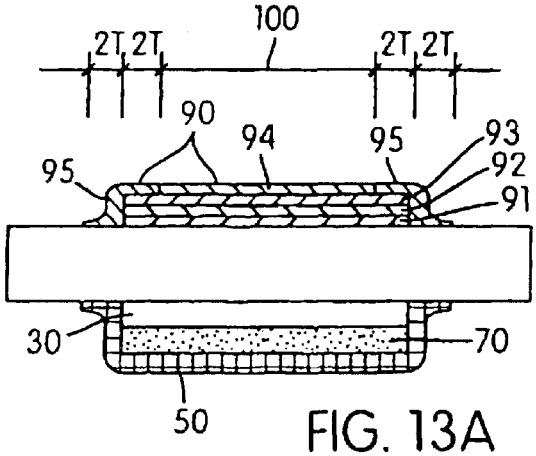
FIG. 13A
(Amended)
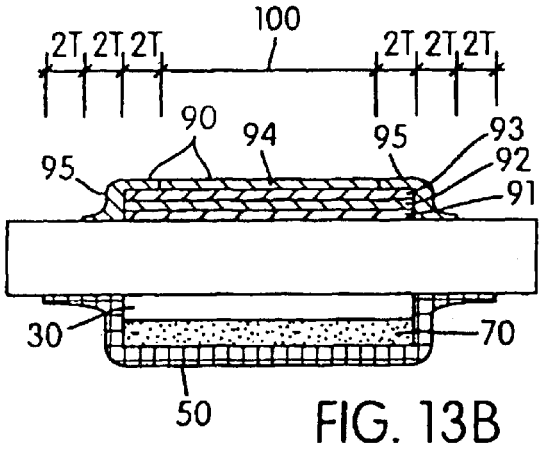
FIG. 13B
(Amended)
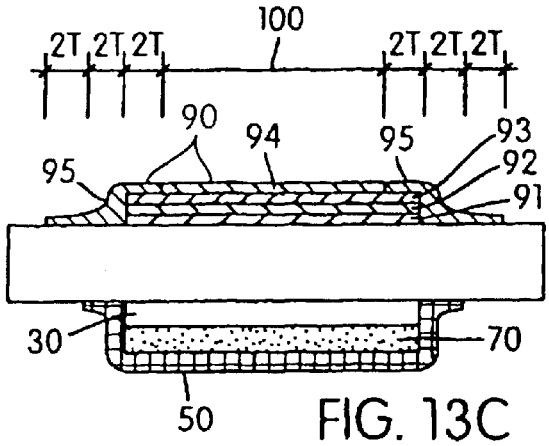
FIG. 13C
(Amended)

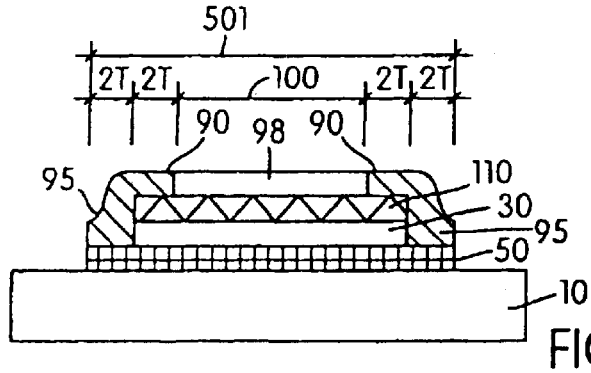
FIG. 20A
(Amended)
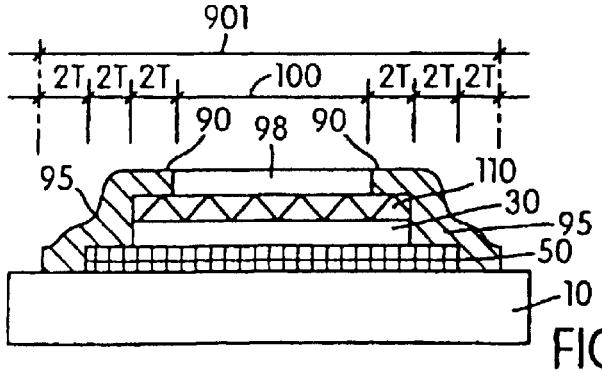
FIG. 20C
(Amended)

PARTIAL PRINTING OF A SUBSTRATE WITH EDGE SEALED PRINTED PORTIONS

Matter enclosed in heavy brackets [ ] appears in the original patent but forms no part of this reissue specification; matter printed in italics indicates the additions made by reissue.

This invention relates to the partial printing of a substrate with a plurality of layers to form a partially printed panel. Within each printed portion, at least one layer is applied to the substrate with inexact registration in relation to a second layer. A "control layer" comprising "edge sealing strips" is printed so that, within each printed portion, each edge of the at least two layers with inexact registration is located within the edges of an overlapping edge sealing strip. The edge sealing strips may provide a visual seal or mask at the edges of printed portions, for example to enable the each printed portion to have the desired color rendering that would otherwise not be consistently achieved through lack of registration. There are many other applications for the invention, for example to control any other incident wave characteristics of the partially printed panel, for example its solar radiation transmission, absorption and reflection characteristics. The invention can enable the physical sealing of printed portions containing gaseous or liquid fluids or particles in suspension, such as fragrances, or to produce printed portions to contain medication, for example skin patches with improved medication transfer control. Other applications of the invention include security printing, security labels, security seals and environmentally reactive labels, for example labels indicating the temperature regime to which a labeled product has been subjected.

BACKGROUND TO THE INVENTION

There are a number of visual and other functional benefits in printing only part of the area of a substrate, some of which are outlined in GB 2 118 096 (Hill & Yule), GB 2 165 292 (Hill), PCT/GB98/02600 (Hill) and PCT/GB97/00020 (Hill).

Methods of partially printing a substrate with substantially exact registration of superimposed layers are outlined in GB 2 118 096, GB 2 165 292, GB 2 188 873, PCT/GB96/02600, PCT/GB97/02788 (Hill and Godden) and PCT/IB00/00267 (Hill and Clare). However, these methods typically involve the use of special inks and additional production stages compared to the simple deposition of layers of ink or other marking material. Partially printed substrates can typically be produced more economically by conventional methods of printing having inexact registration, providing any undesirable effects of such lack of registration can be consistently overcome.

PCT/GB96/02600 discloses why conventional printing processes all suffer inexact registration, owing to:

i) printing machine error or "tolerance" in delivering ink or other marking material, ii) the dimensional instability of a liquid ink or other marking material in liquid state on a substrate, iii) the dimensional instability of a substrate through temperature and humidity changes between printing "passes" (printing of individual layers), and iv) the error or "tolerance" in delivery of a substrate into the printing position.

Panels according to GB 2 165 292 cannot be reliably produced with conventional printing methods without special measures to overcome the otherwise inevitable color variance from that desired, both over the area of a single panel and between panels within a production run. Two such methods of creating acceptable panels by the management of conventionally printed layers are described in PCT/GB96/02600, referred to as the "Lateral Combination Method" and the "Through Combination Method."

FIGS. 1A–8F and 8J–33 are diagrammatic cross-section through prior art partially printed panels. FIGS. 8G–I are plan views of a panel.

With regard to those figures illustrating a cross-section through a single printed portion on a substrate 10, it should be understood that the single printed portion is typically representative of a plurality of such printed portions on a cross-section through substrate 10.

Figure 1B:
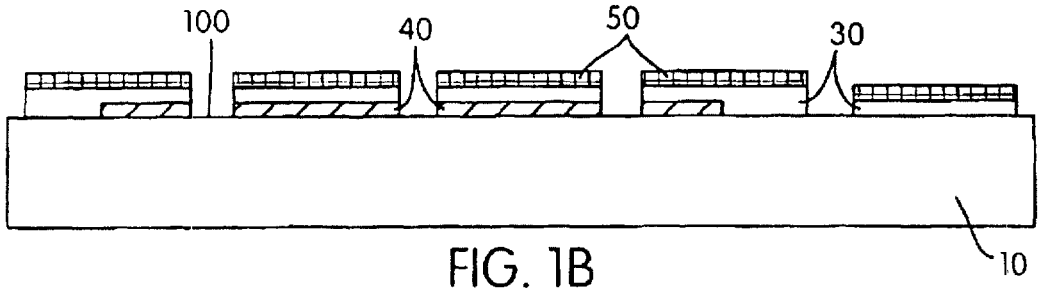
FIG. 1B PRIOR ART

FIGS. 1A and 1B illustrate prior art vision control panels according to GB 2 165 292, which comprise transparent substrate 10 and printed portions typically comprising black layer 50, white layer 30 and design color layer 40 superimposed with substantially exact registration, such that design color layer 40 is visible from one side of the panel but is not visible from the other side of the panel.

Figure 1C:
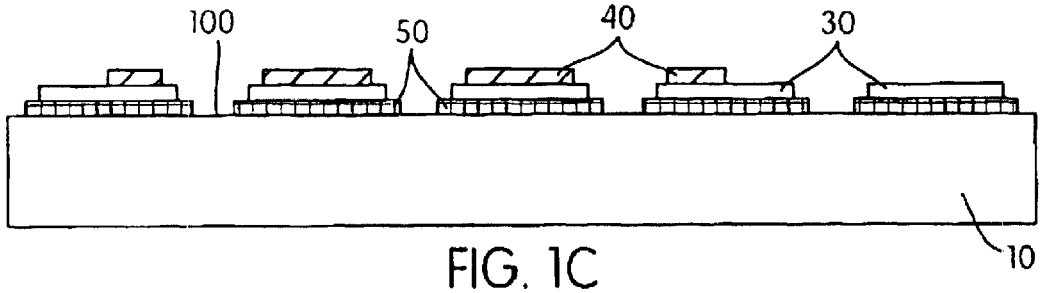
FIG. 1C PRIOR ART
Figure 1D:
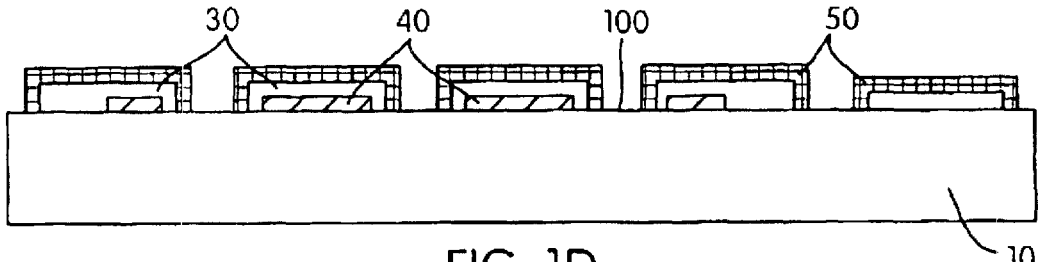
FIG. 1D PRIOR ART
Figure 1E:
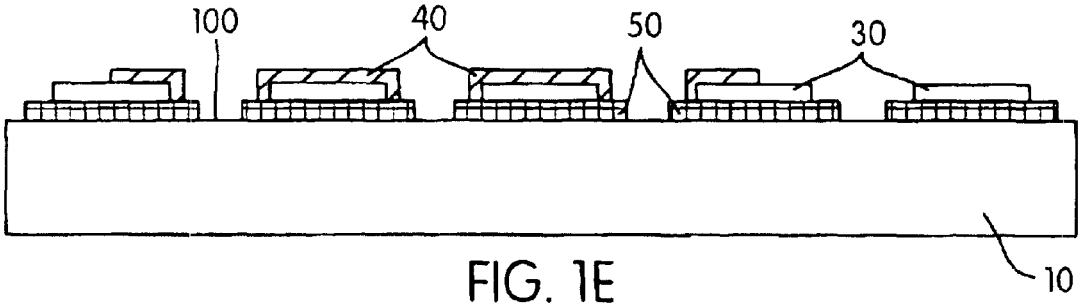
FIG. 1E PRIOR ART
Figure 1F:
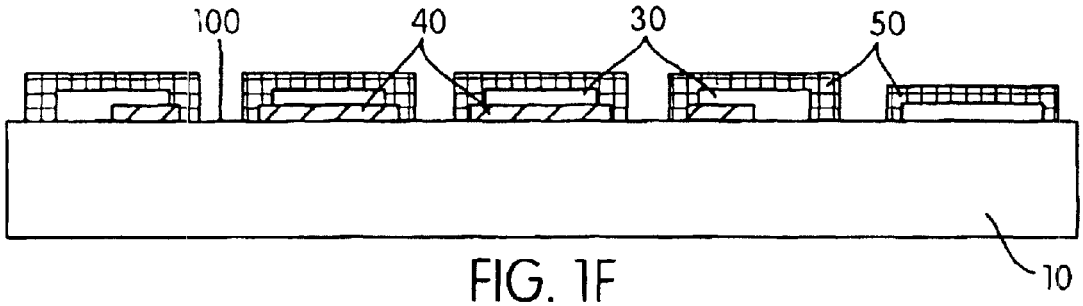
FIG. 1F PRIOR ART
Figure 2A:
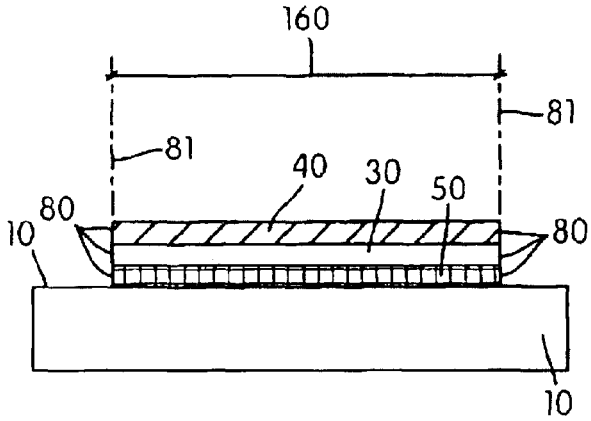
FIG. 2A PRIOR ART
Figure 2B:
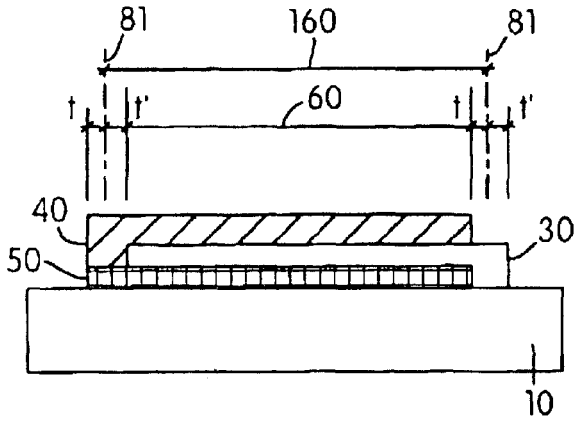
FIG. 2B PRIOR ART

FIGS. 1C and 1D illustrate the "Lateral Combination Method" and FIGS. 1E and 1F illustrate the "Through Combination Method" of overcoming the inevitable lack of registration and problems that would otherwise result if it was attempted to print multiple layers of the same dimensions within printed portions by conventional means. FIG. 2A illustrates a notional arrangement in which substrate 10 has black layer 50, white layer 30 and design color layer 40 in substantially exact registration, having "desired perceived color" width 160 between the desired coterminous alignment of outer edges 80 at desired outer edge locations 81. If conventional printing methods are used to try to print the notional arrangements of FIG. 2A, because of the inevitable lack of registration, the layers will typically each be displaced laterally, for example as illustrated in FIG. 2B, in which layers 40 and 50 have moved by a dimension "t" to the left of their desired alignment and layer 30 has moved by a dimension "t" to the right of its desired alignment. As outlined in PCT/GB96/02600, such registration errors will typically cause very substantial changes from the colors that are desired to be perceived on particular parts of a single panel, and variance from panel to panel in a production run. In FIG. 2B, owing to registration error, the white layer 30 overlaps beyond the black layer 50 and thus is visible from the other side of the panel and increases the width of this printed portion, both undesirable features for panels according to GB 2 165 292. Also, if design layer 40 comprises a translucent ink, for example a single "spot" translucent color ink or the cyan, magenta, yellow and black translucent inks of a CMYK four color process design, such lack of registration on a relatively small printed portion causes dramatic variance of perceived color from that desired. Where the translucent design color layer 40 ink lies over black layer 50 it will be effectively rendered invisible by the underlying black layer. The actual perceived color width 60 of the translucent design color layer 40 ink overlying the white layer 30 is less than the desired perceived color width 100. Also, part of the white layer 30 is exposed for a width of $t+t^1$. The actual perceived color has a reduced intensity and lightened greytone compared to that desired.

Depending on the method of printing, the equipment used, the operator's skills, the disciplines introduced to control registration, the type of substrate, the size of the area being printed and the direction of application of ink, for example the direction of a squeegee pull in screen printing, the reliably achievable registration tolerance will vary.

However, for any given printing set-up, it is possible to establish a reliably achievable registration tolerance "T" in a given direction in relation to the direction of application of ink. It is typically desirable to produce products according to [GB 2 188 873] *GB 2 165 292* according to the "Lateral Combination Method" or "Through Combination Method" of PCT/GB96/02600 with printed portions in a pattern of lines oriented in the direction of application of ink. This is because the registration tolerance "T" is less perpendicular to the lines than the registration tolerance "T+ΔT" in the direction of application of ink. Thus, in screen printing, lines would typically be oriented in the direction of squeegee pull; in litho printing the lines would be orientated parallel to the direction of travel of the substrate through the machine.

Figure 3A:
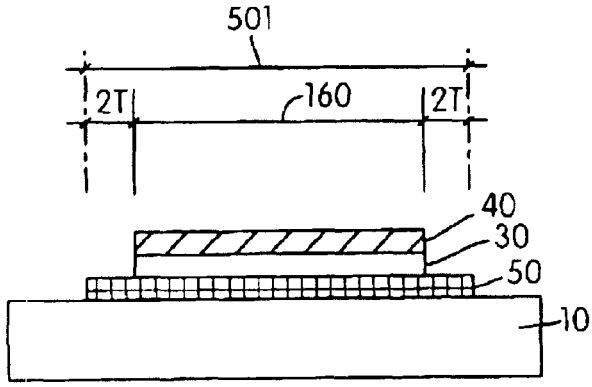
FIG. 3A PRIOR ART
Figure 3B:
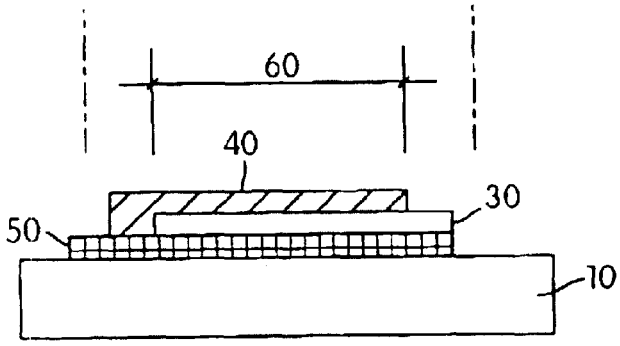
FIG. 3B PRIOR ART

[GB 2 188 873] *GB 2 165 292* identifies in "Overlap Method 1" that a design visible from one side of a panel can be obscured from visibility from the other side of a panel by the simple expedient of one layer, typically a black silhouette pattern layer according to that invention, overlapping other layers, typically one or more white background layers and one or more design color layers. FIG. 3A is a notional cross-section through a printed portion illustrating a notionally desired arrangement of applying this Overlap Method, in which the black layer 50 of width 501 overlaps by 2T beyond each outer edge of the white layer 30 and the design color layer 40 having a desired perceived color width 160. FIG. 3B illustrates an example to print the notional arrangement of FIG. 3A, the printed design color layer 40 and background white layer 30 being misaligned. Ink colors are typically designed to be printed on a white substrate and the desired color rendering will only be seen over the perceived color width 60 in which the design color layer 40 is superimposed over the white layer 30. The area of white exposed will lighten the perceived color and the design color layer 40 will be rendered less or not visible where it overlaps directly onto the black layer 50.

Figure 4A:
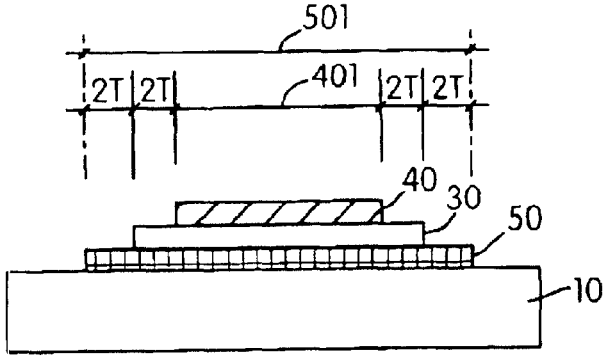
FIG. 4A PRIOR ART
Figure 4B:
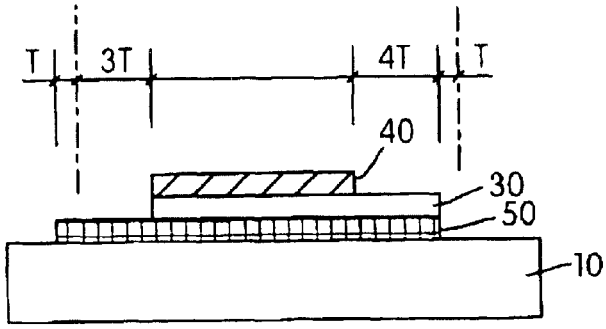
FIG. 4B PRIOR ART

The prior art "Lateral Combination Method" of PCT/GB96/02600 illustrated in FIGS. 1C, 1D, 4A and 4B provides for the design color layer 40 to be seen in lateral combination with the white layer 30 by which is overlapped. In the notional arrangement of FIG. 4A, the outer edges of the design color layer 40 are 2T inside the width of the white layer 30. This ensures design color layer 40 will not overlap onto the black layer 50. A standard combined edge width of 4T of white is always seen in lateral combination with a standard width 401 of design color layer 40, thus enabling a method of printing to achieve uniform color rendering. The outer edges of white layer 30 are nominally 2T inside the outer edges of black layer 50, ensuring that the white layer 30 does not overlap the black layer 50. FIG. 4B illustrates an example printing of such an arrangement, in which the black layer 50 and design color layer 40 have been printed T to the left of their intended position and white layer 30 has been printed T to the right of its intended position but the criteria for consistent color rendering are maintained. This Lateral Combination Method has the disadvantage that there are always white edges visible throughout the panel and therefore design colors need to be adjusted to allow for this "whitening" of the printed design color ink. Another disadvantage is that very dark design layer colors, including black, cannot be produced by a consistent application of this method.

Figure 5A:
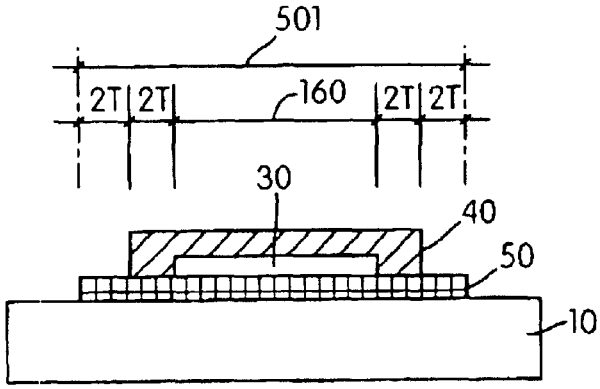
FIG. 5A PRIOR ART
Figure 5B:
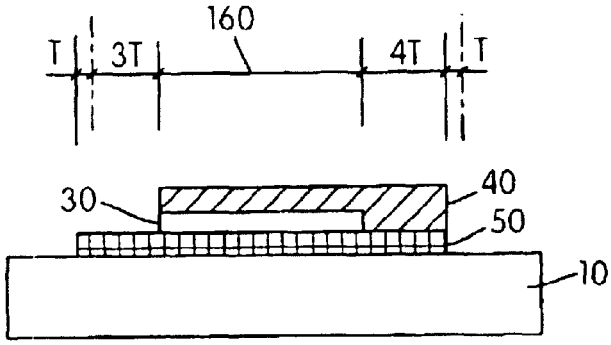
FIG. 5B PRIOR ART
Figure 5C:
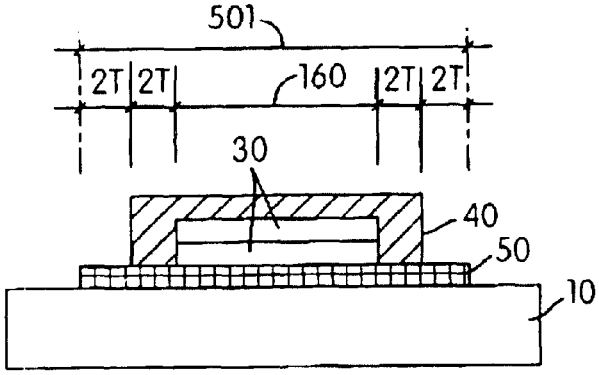
FIG. 5C PRIOR ART

The prior art "Through Combination Method" of PCT/GB96/02600 illustrated in notional cross-section FIG. 5A requires the design color layer 40 to be translucent and to be seen in combination with the white layer beneath it. The notionally desired arrangement is for the outer edges of the white layer 30 to be 4T inside the outer edges of the black layer 50 and the outer edges of the design color layer 40 to be 2T inside the outer edges of the black layer 50. This ensures that the design color layer 40 covers the white layer 30 but does not overlap the underlying black layer 50. Consistent desired color rendering is achieved over the desired perceived color width 160, because where the design color layer 40 overlaps onto the black edge strips of black layer 50, the design color inks are rendered virtually invisible by the underlying black layer 50. However much the layers move relatively to each other within the maximum tolerance of plus or minus T, a uniform desired perceived color width 160 will always be achieved, as illustrated in FIG. 5B, in which black layer 50 and white layer 30 have moved by T to the left and design color layer 40 has moved by T to the right. This "Through Combination Method" has found wide commercial application in the UK and USA, for example in the production of panels according to [GB 2 188 873] *GB 2 165 292* as outdoor advertisements on the windows of payphone kiosks and retail establishments.

Figure 5D:
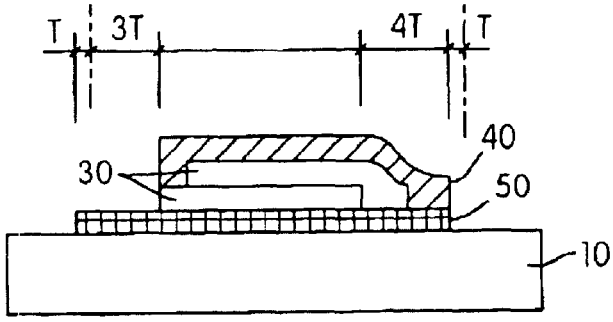
FIG. 5D PRIOR ART
Figure 6A:
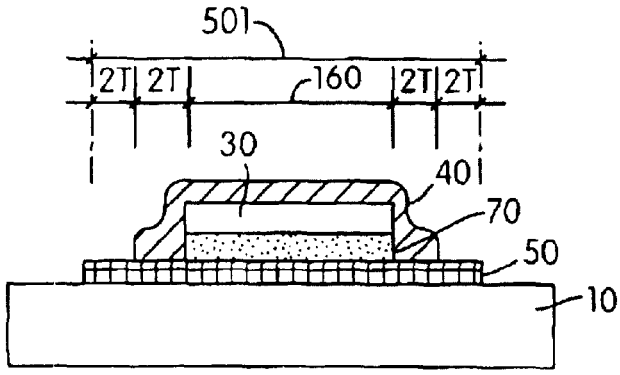
FIG. 6A PRIOR ART
Figure 6B:
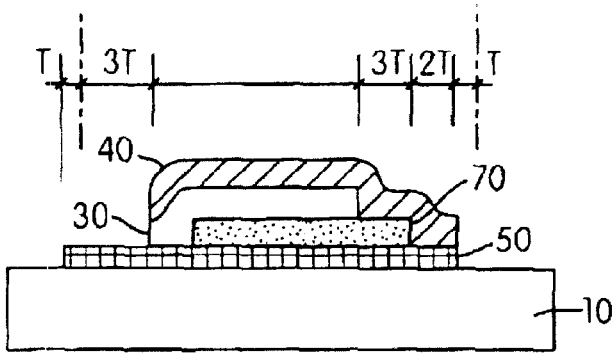
FIG. 6B PRIOR ART
Figure 7A:
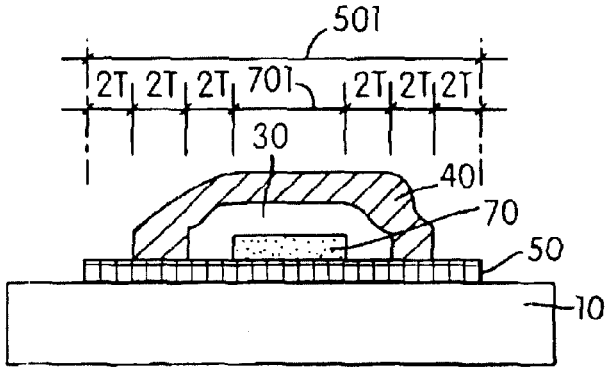
FIG. 7A PRIOR ART
Figure 7B:
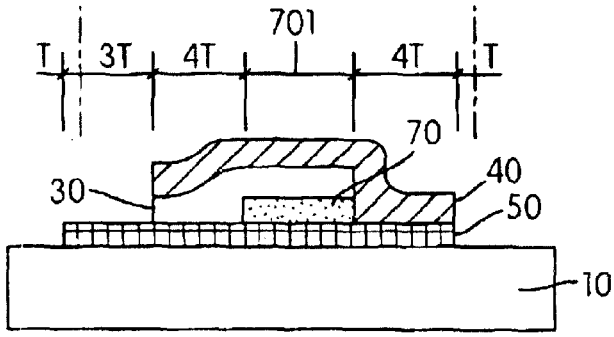
FIG. 7B PRIOR ART

However, in the production of such panels, in order to achieve the required opacity of a white background layer 30, it has been found necessary to print several layers of white or to introduce one or more layers of silver in between the white and the black layers, both well known prior art methods of improving the perceived whiteness and opacity of a white layer. A notional arrangement of FIG. 5C in which two white layers 30 are superimposed leads in reality to the two layers 30 being offset, as illustrated in FIG. 5D, causing variation in the perceived color of design color layer 40. A notional arrangement of the "Through Combination Method" illustrated in FIG. 6A, in which a silver layer 70 of the same width as the white layer 30 is interposed between the white layer 30 and black layer 50 also causes problems of lack of registration. An actual printed portion, for example as illustrated in FIG. 6B, typically results in the layers being moved relative to each other by up to the maximum tolerance T, resulting in part of the design color layer 40 being superimposed on the white layer 30 on one edge with no underlying silver layer 70 and a part of the design color layer 40 being superimposed on silver layer 70 where there is no intervening white layer 30. Both of these parts of the design color layer 40 will tend to appear darker than with the intended construction of design color layer 40 over white layer 30 over silver layer 70 over black layer 50. Overlapping of the silver layer beyond the edges of the white layer can be prevented by adopting the notional arrangement of FIG. 7A, in which the outer edges of silver layer 70 are 2T inside the outer edges of white layer 30. However this is an arrangement and will result in an arrangement, such as FIG. 7B, in which there will still be a difference in perceived color depending on whether the design color layer 40 only has a white layer 30 between it and the black layer 50 or the desired arrangement of design color layer 40 over white layer 30 over silver layer 70 over black layer 50. For example, where a design requires an area of white, this will always be "less white" than if white layer 30 was underlain by silver layer 70 throughout the width of the white layer 30. Another disadvantage of the "Through Combination Method" is that to achieve consistent color rendering, the design color inks are required to be translucent, in order for them to be rendered substantially invisible when overlapping directly onto the black layer. While multi-color process inks, such as the 4 color process inks of cyan, magenta, yellow and black, are typically translucent, many 'spot' or 'line' colors of a single hue, intensity and greytone are opaque or sufficiently opaque to be clearly visible against a black background, especially darker 'spot' colors and metallic 'spot' colors, such as silver and gold. While ink manufacturers typically provide 'spot' colors in differing degrees of translucency, there is less choice and flexibility with a limitation of translucent inks. Silver, which is typically a particularly opaque ink and is used as an opacity 'barrier' background of white, as already described, is also a common color in advertising and corporate identity products, for example in the red, white and silver corporate identity of the Coca Cola company. Additionally, it is not possible to obtain ceramic inks that are sufficiently translucent for the Through Combination Method over the full range of desired colors. Another type of ink which is not effectively obscured by an underlying black layer is retro-reflective ink, typically comprising half-silvered glass micro-spheres which cause incident light to be reflected back along substantially the same light path. Retro-reflective ink is therefore clearly visible at night when illuminated by car headlights or other light source directed from the position of an observer. The 'Through Combination Method' is deficient in the manufacture of all such products incorporating design color layer inks which are not translucent or otherwise are clearly visible over a black layer.

THE INVENTION

According to the present invention a panel comprises a substantially imperforate substrate and a print pattern adhered to said substrate, said print pattern being printed onto only part of said substrate and comprising at least three layers including a first layer, a second layer, and a control layer, said first layer, said second layer, and said control layer being configured and disposed such that a cross-section taken through said panel comprises two outer edges of said substrate and alternate printed portions of said substrate and unprinted portions of said substrate, each said printed portion having two outer edges, and wherein within said cross-section of said panel each of a plurality of said printed portions being constructed and arranged such that they each include a part of said first layer and a part of said second layer and a part of said control layer, said plurality of said printed portions each including two outer edges of said part of said first layer and two outer edges of said part of said second layer and two outer edges of said part of said control layer, and wherein within each of said plurality of said printed portions said part of said second layer is located between said part of said first layer and said part of said control layer, and wherein the width between said two outer edges of each of said plurality of said printed portions is less than one centimeter, and wherein said part of said control layer comprises two edge sealing strips and each of said two edge sealing strips comprises one of said two outer edges of said part of said control layer and an inner edge, and wherein one of said two outer edges of said part of said first layer and one of said two outer edges of said part of said second layer are positioned within said outer and inner edges of one of said two edge sealing strips and the other of said two outer edges of said part of said first layer and the other of said two outer edges of said part of said second layer are positioned within said outer and inner edges of the outer of said two edge sealing strips.

Figure 8B:
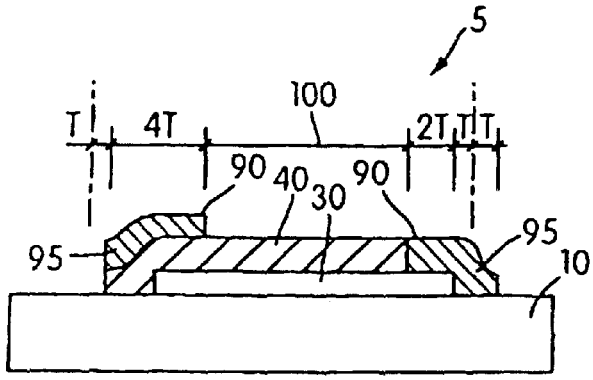

FIG. 8A is a notional cross-section through one of a plurality of printed portions 5 on one side of substrate 10, in which the outer edges of the first layer 30 and second layer 40 are within the edge sealing strips 95 of control layer 90 having overall width 901 and control width 100 between the inner edges of edge sealing strips 95. In the notional arrangement of FIG. 8A, the outer edges of first layer 30 and second layer 40 are coterminous and are 2T inside the outer edges of control layer 90 and the edge sealing strips are each at least 4T wide. T is the maximum registration error or reliable achievable registration tolerance in the printing of an edge of a layer of ink or other marking material in the direction of the cross-section through substrate 10. This notional arrangement ensures that each printed portion will be of width 901 and the outer edges of first layer 30 and second layer 40 are both within edge sealing strips 95. FIG. 8B illustrates an extreme example of an actual printed portion in which first layer 30 and, control layer 90 have been printed T out of position to the right and second layer 40 has been printed T out of position to the left but the outer edges of first layer 30 and second layer 40 are still within sealing strips 95. The edge sealing strips 95 obscure or mask the lack of registration of the outer edges of the first layer 30 and second layer 40. First layer 30 and second layer 40 are typically interactive or otherwise mutually beneficial in a panel of the invention. For example, first layer 30 might be a white layer of ink which forms a good background against which to sight a design color layer 40. The invention ensures that the design color layer 40 is seen from one side of the panel against a white layer across the full control width 100 of control layer 90 within printed portion 5. In this way, the desired perceived color is achieved on each printed portion in a panel constructed and arranged in this manner.

Figure 8C:
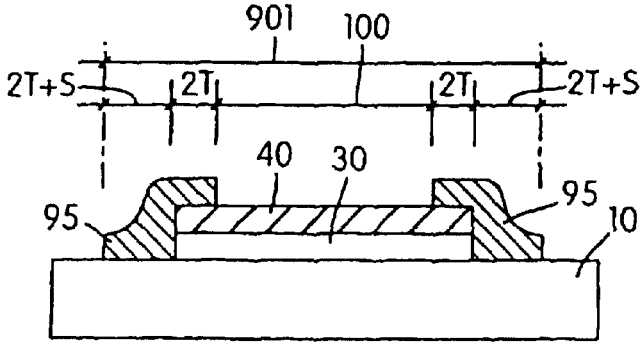
Figure 8D:
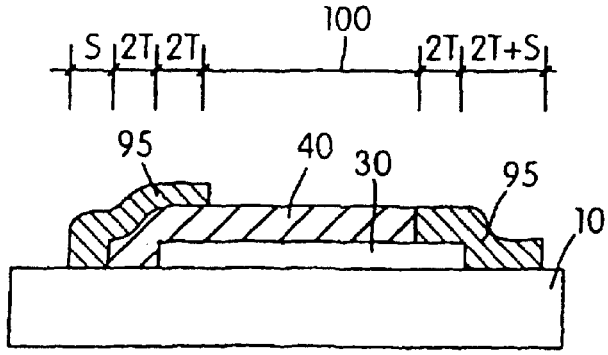
Figure 8G:
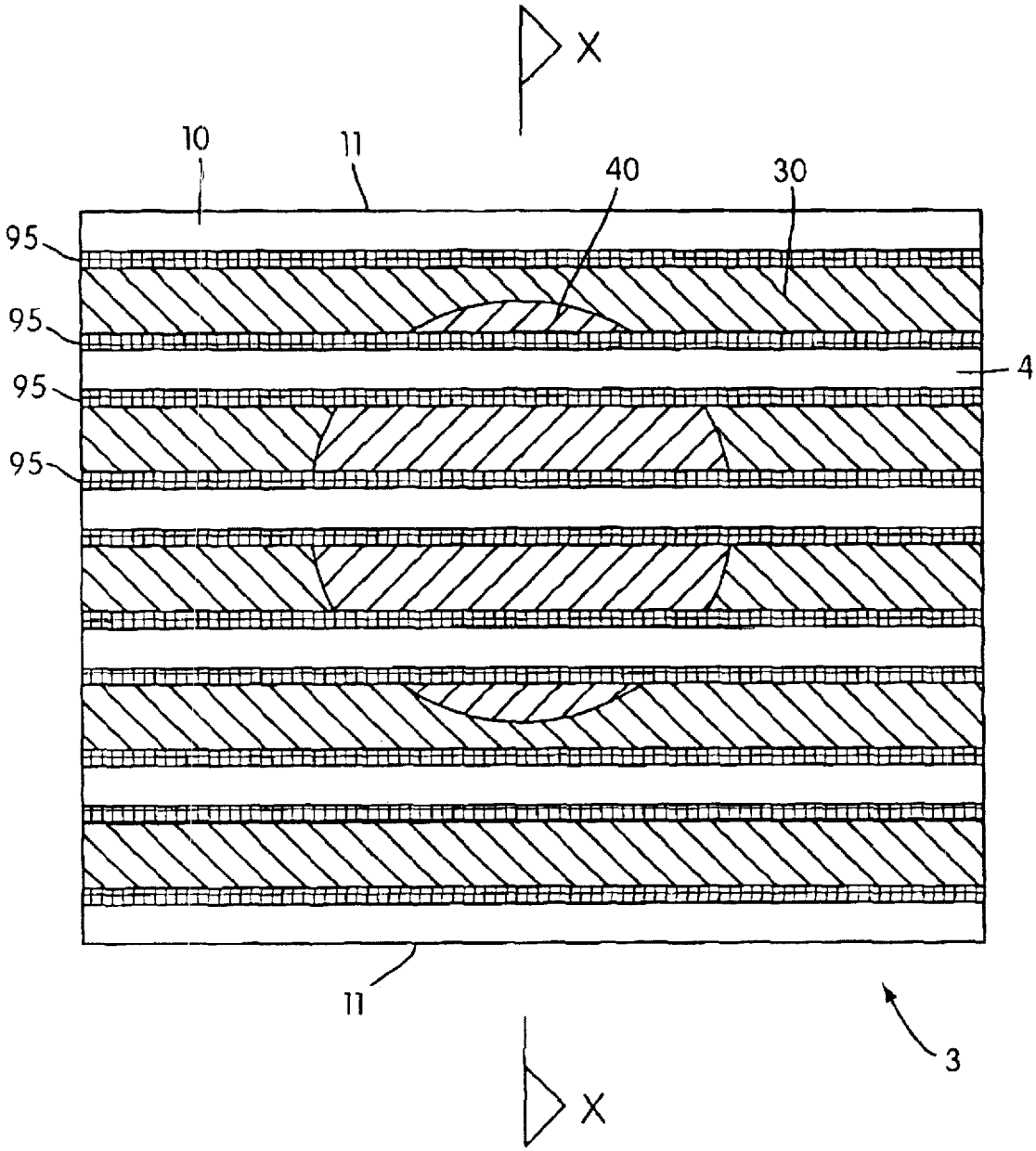
Figure 8H:
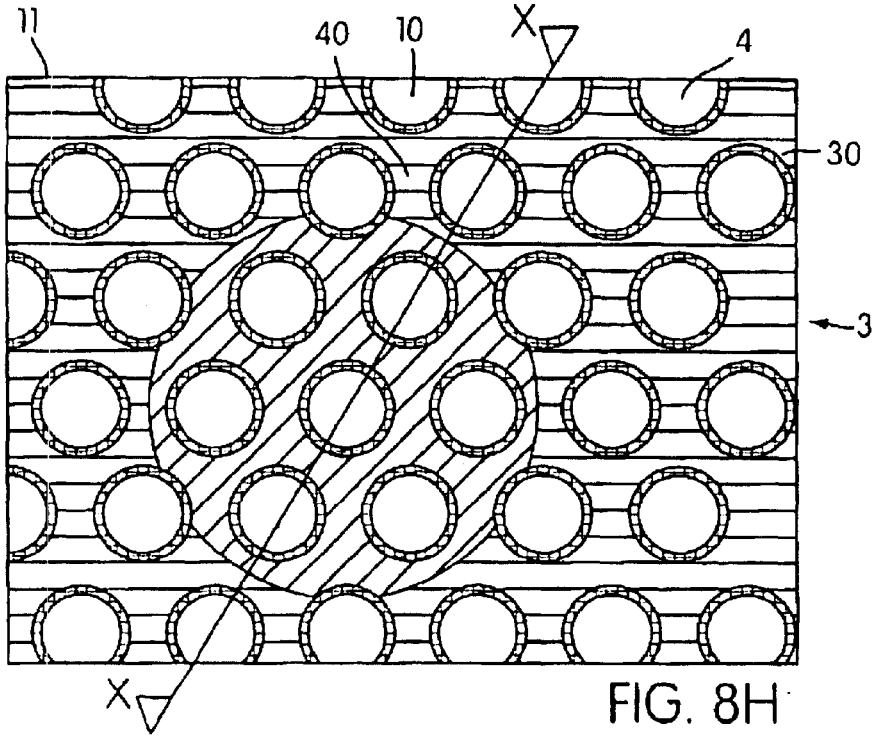
Figure 8I:
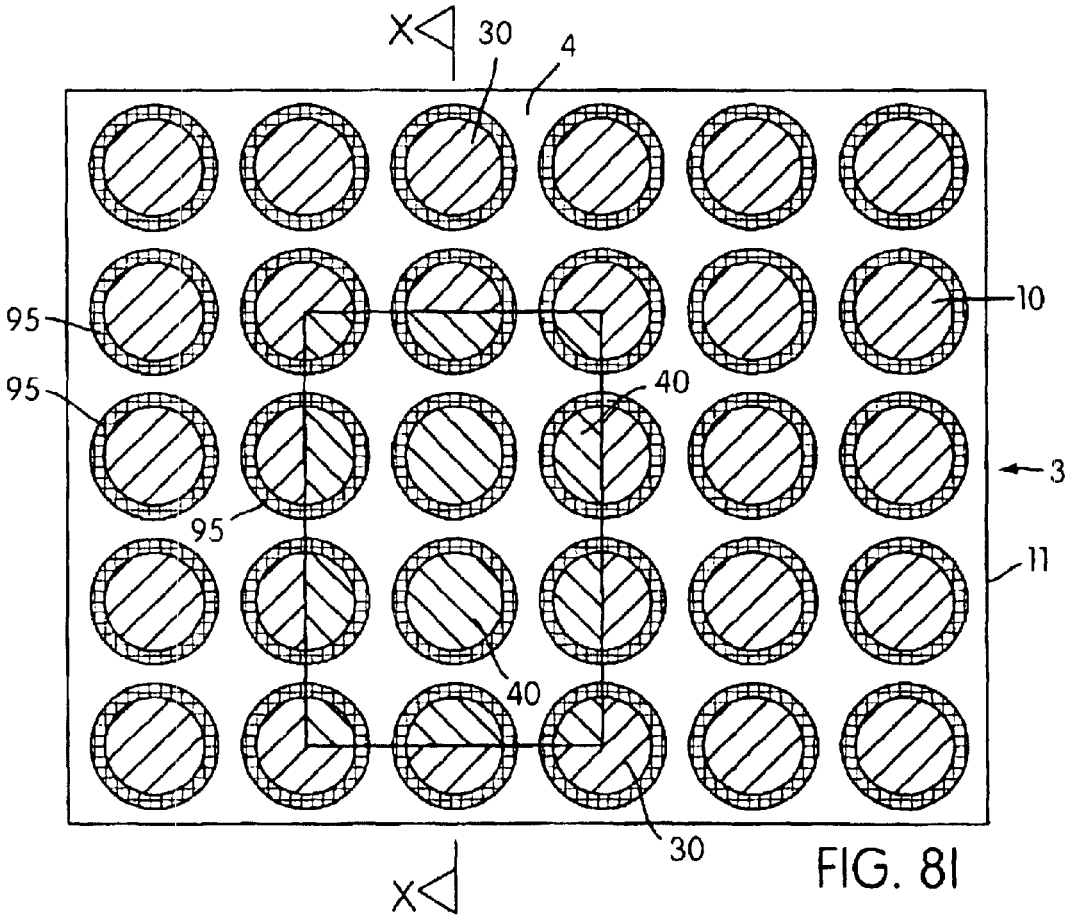
Figure 8J:
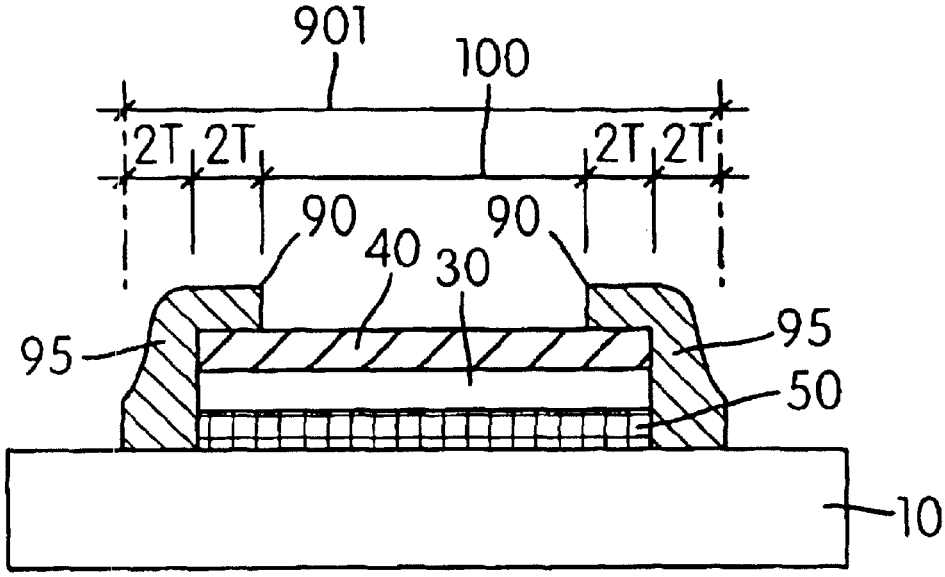
Figure 8K:
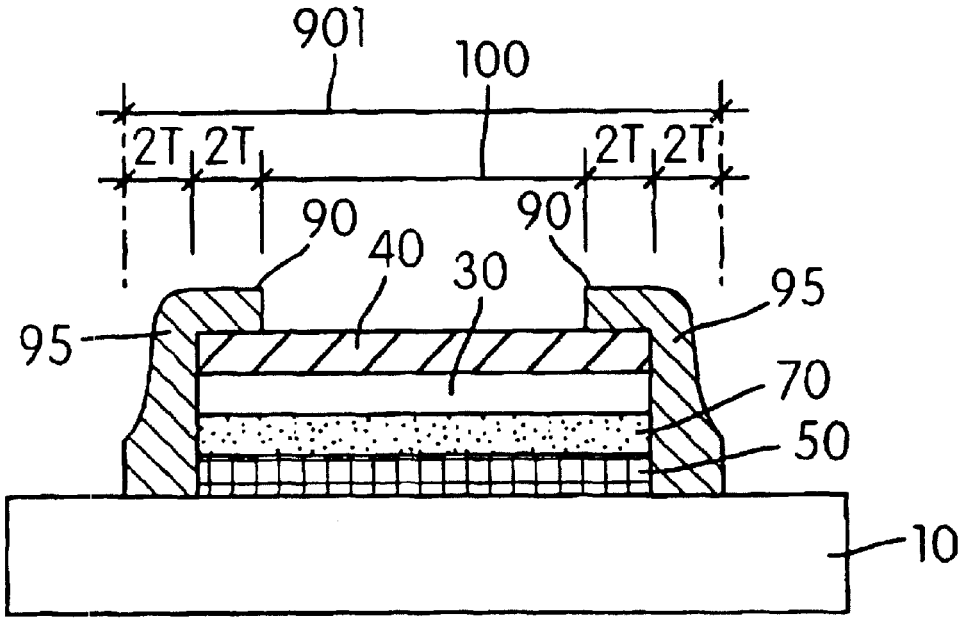

In the notional arrangement of FIG. 8C, the edge sealing strips are wider than in FIG. 8A, to ensure a minimum sealing width 'S' between the edge sealing strips 95 and the substrate 10, as can be seen in FIG. 8D.

In the following descriptions of the figures, the layers applied to a substrate are sometimes described in absolute terms, such as first layer, second layer, another layer, base layer and control layer, but in order that the invention is more readily understood and to more easily recognize the improvements of the invention over the prior art, the various layers are sometimes described in similar terms to the prior art vision control panel constructions over which the invention has particular advantages. Thus, white layer 30 is an example of a first layer 30 and may be of any color or other feature. Design color layer 40 is an example of a second layer 40 and may be of any color or other feature. Design color layer 40 may be a multi-color process layer, for example a four color process layer in which the deposits of individual colors, typically cyan, magenta, yellow and black are discontinuous and there may be no deposit of ink within a part of such a layer, the width between the outer edges of part of a multi-color process layer in a printed portion being deemed to be the same as the width between the outer edges of the white layer 30 in the same printed portion. Black layer 50 is an example of a base layer 50 and may be of any color or other feature. Silver layer 70 is an example of another layer 70 and may be of any color or other feature. Transparent substrate 10 is an example of substrate 10 and may have any substrate characteristics. The form of construction and arrangement of any printed portion described in terms of color layers should be understood to disclose the illustrated relationships of the various layers of any materials for any product for any purpose. FIG. 8E is a cross-section through a panel with substrate 10 having two outer edges 11 and printed on one side 12 having alternate printed portions 5 and unprinted portions 4. Each printed portion 5 has two outer edges 6, each first layer 30 has two outer edges 7, each second layer 40 has two outer edges 8 and each control layer 90 has two edge sealing strips 95 having two outer edges 2 and two inner edges 3. The print pattern areas divide the panel into a plurality of discrete printed areas and/or a plurality of discrete unprinted areas. Examples of print patterns include discrete areas of circular dots, hexagons, squares, triangles or other regular or irregular shapes, straight or curved discrete lines, grid patterns with unprinted areas of circular, hexagonal, square, triangular or other regular or irregular shape and chequerboard patterns. FIG. 8G shows a plan view of one side of panel 3 with a print pattern of lines on substrate 10 with outer edges 11 and unprinted portions 4. FIG. 8F is the cross-section X—X. Design color layer 40 in the form of a circle is visible against white layer 30 and edge sealing strips 95. FIG. 8H is a plan view of a panel with a print pattern comprising a plurality of discrete unprinted circles and FIG. 8I is a plan view of a panel with a print pattern comprising a plurality of dots. Cross-section X—X in each of FIGS. G–I is similar to FIG. 8F.

The printed portions can be of identical construction in the number and thickness of layers, cross-sectioned dimensions, etc., or may vary across a panel. First layer 30 typically extends across the full control width 100 within every printed portion of a cross-section through a panel, as may second layer 40, as illustrated in FIG. 8E. Alternatively, second layer 40 can be discontinuous, for example layer 40 might be a multi-color printing process, in which each individual color, for example cyan, magenta, yellow and black is typically discontinuous, typically in the form of a half-tone or stochastic pattern. Second layer 40 can comprise one or more 'spot' or 'line' uniform colors which form a recognizable design. In FIG. 8F, second layer 40 is a design color layer 40 which extends over dimension 401 between two outer boundaries 20, one outer boundary located on one printed portion 52 and the other located on another printed portion 53, there being a plurality of printed portions 5 between the one printed portion and the other printed portion, which each contains a part of the second layer 40. Typically, in this plurality of printed portions, the second layer 40 extends across the full control width 100, each outer edge 7 of the part of second layer 40 lies within an outer edge 2 and an inner edge 3 of an edge sealing strip 95. In at least the one printed portion 52 and the another printed portion 53, one of the outer edges 7 of part of second layer 40 forms an outer boundary 20 of second layer 40. This outer edge 7 of the part of second layer 40 is spaced within the inner edges 3 of edge sealing strips 95 and the other outer edge 7 of the part of second layer 40 lies within outer edge 2 and inner edge 3 of one of the edge sealing strips 95.

Figure 9A:
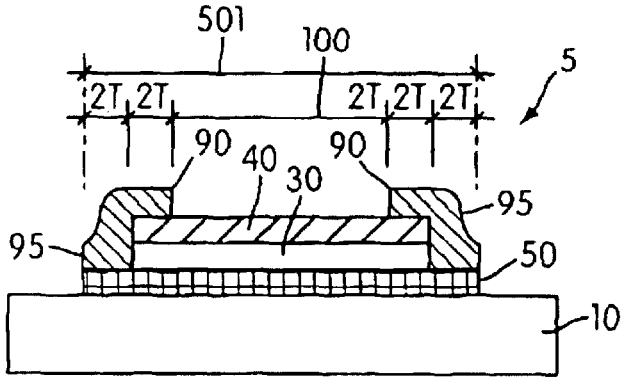
Figure 9B:
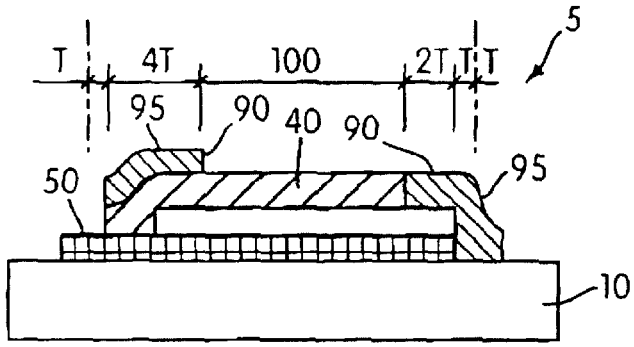
Figure 9C:
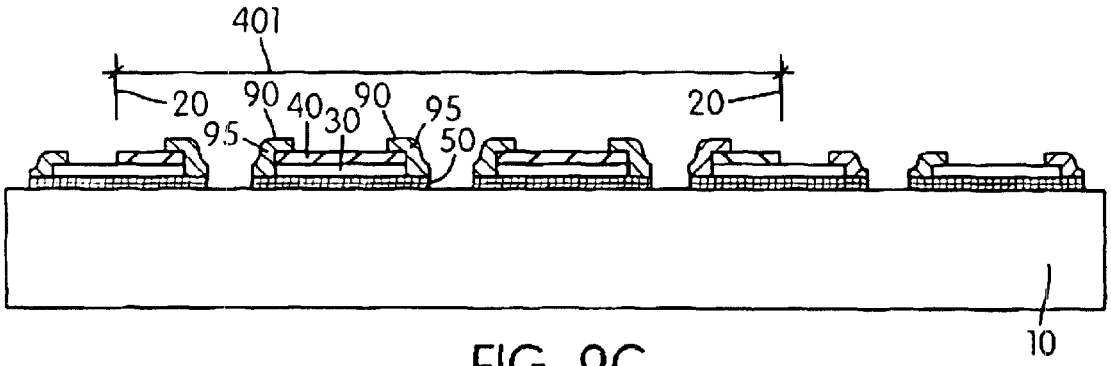
Figure 9D:
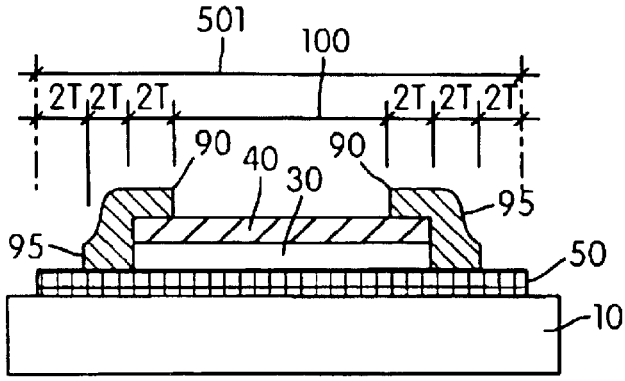
Figure 9E:
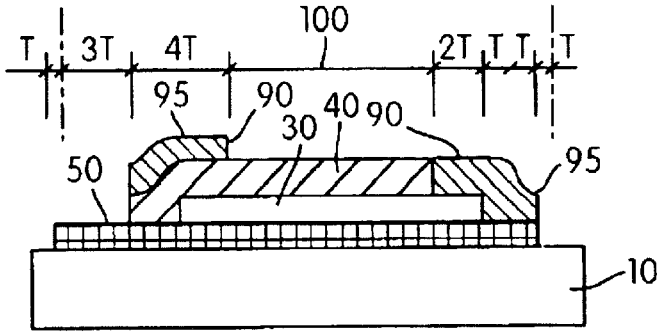
Figure 9F:
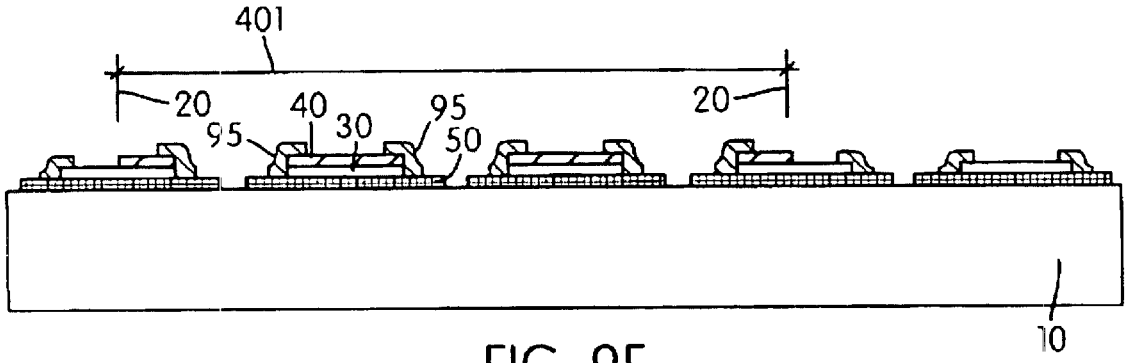
Figure 9H:
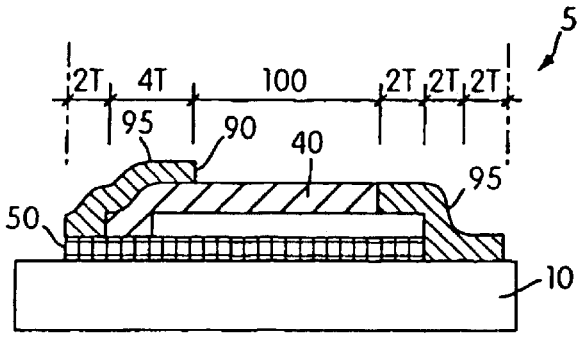
Figure 9I:
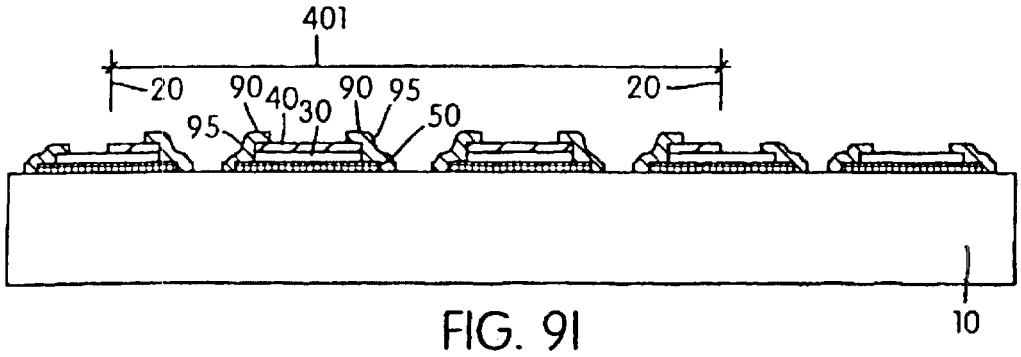

In FIGS. 9A and 9C, a control layer 90 comprising edge sealing strips 95, a second or design color layer 40 and a first or white layer 30 are printer on a base layer 50, for example a black layer 50, of width 501 on a substrate 10. The edge sealing strips 95 are typically black and are of sufficient width to ensure that they mask the outer edges of any of the plurality of superimposed layers 30 and 40, for example to ensure that no area of white layer 30 is exposed unless so intended in a required design. In the manufacture of the one-way vision panels according to GB 2 165 292, multiple layers of white are commonly required, typically at least two when screenprinting and typically at least eight when litho printing such panels. If layer 30 comprises two or more white layers, the design color layer 40 will always be only seen above all of the white layers beneath it. Thus the method provides consistent color rendering even if multiple layers of white are required to achieve a sufficiently opaque and brighter white, a major advantage over the prior art. In FIG. 9B, in which black layer 50 and design color layer 40 have been printed T to the left and control layer 90 has been printed T to the right, the desired color control width 100 has still been maintained over the desired arrangement of layers of design color layer 40 over white layer 30 over black layer 50. However, the overall width of printed portion 5 is 2T greater than the notional width 501 in FIG. 8C. In panels according to GB 2 165 292, this has the undesirable effect of converting a uniform opacity of silhouette pattern to a variable silhouette pattern according to that invention, the width of portions varying from width 501 to 501 +2T. This results in a varying tinted effect when looking out of a window comprising a panel of that invention compared to a uniform tinted effect that would be achieved by a uniform width of printed portions 501. In order to overcome this problem, the width of printed portions needs to be increased by 4T, as illustrated in the notional arrangement of FIGS. 9D and 9F, such that the overall width of the black layer 50 controls the overall width of each printed portion, even if the maximum registration error on each layer was printed, for example the arrangement shown in FIG. 9E. Alternatively, the overall width of the control layer 90 can be made notionally 4T wider than black layer 50, to provide a uniformly controlled width of each printed portion, as illustrated in FIGS. 9G and 9I. FIG. 9H illustrates that control layer 90 determines the width of the printed portions even if layers are printed out of position by the maximum tolerance T. FIGS. 9C, 9F and 9I illustrate panels of the invention with printed portions according to FIGS. 9A, 9D and 9G respectively, each having design color layer 40 extending over dimension 401 between outer boundaries 20.

Figure 10A:
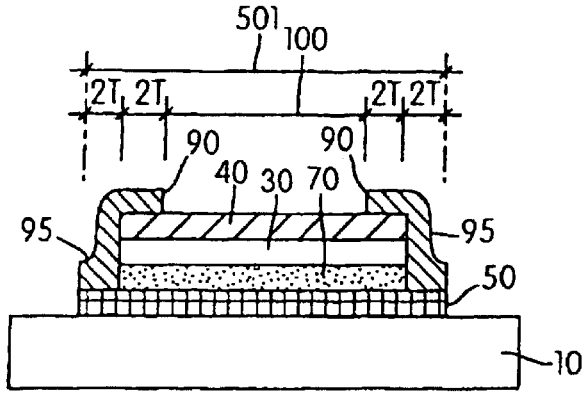
Figure 10C:
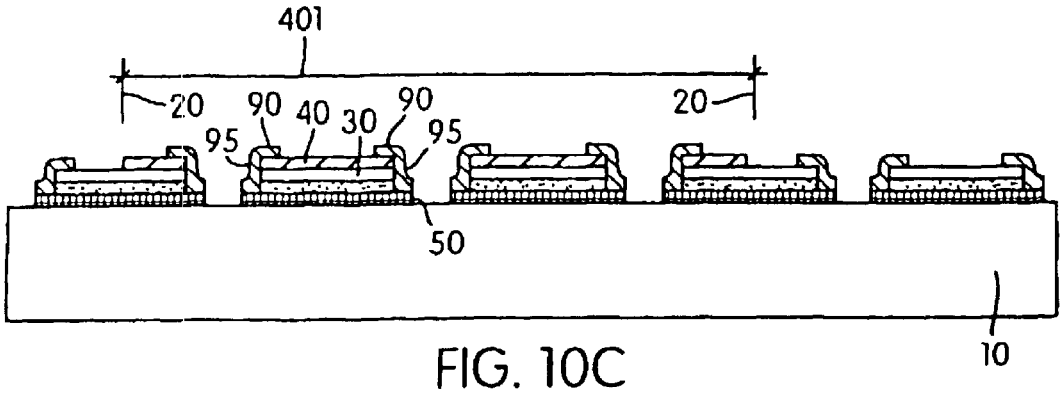
Figure 10D:
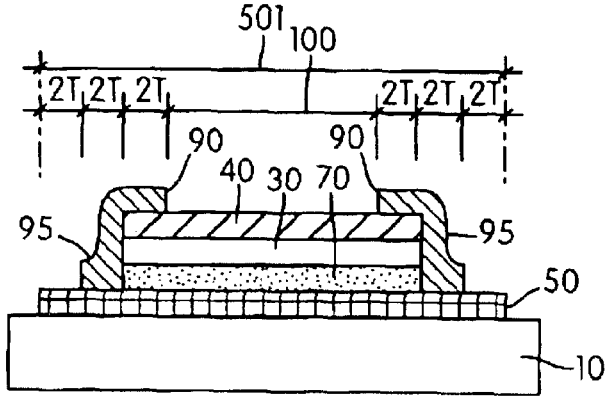
Figure 10E:
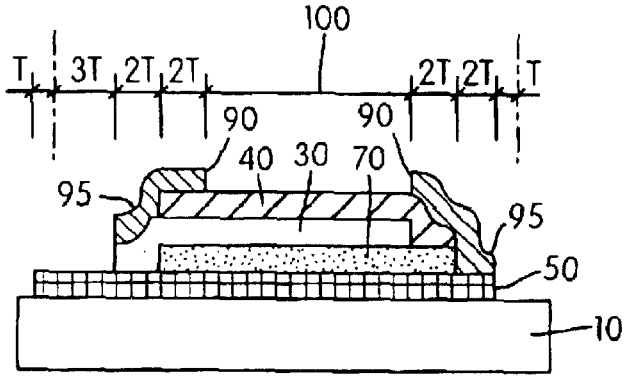
Figure 10F:
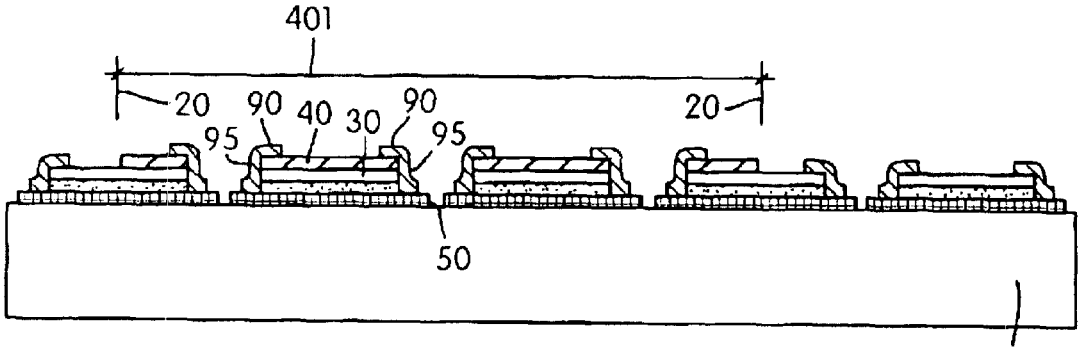
Figure 10G:
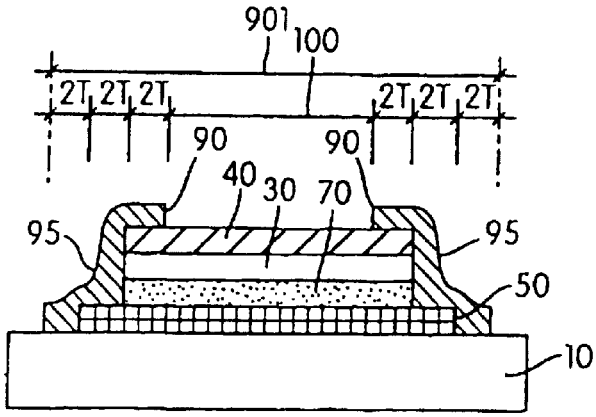
Figure 10I:
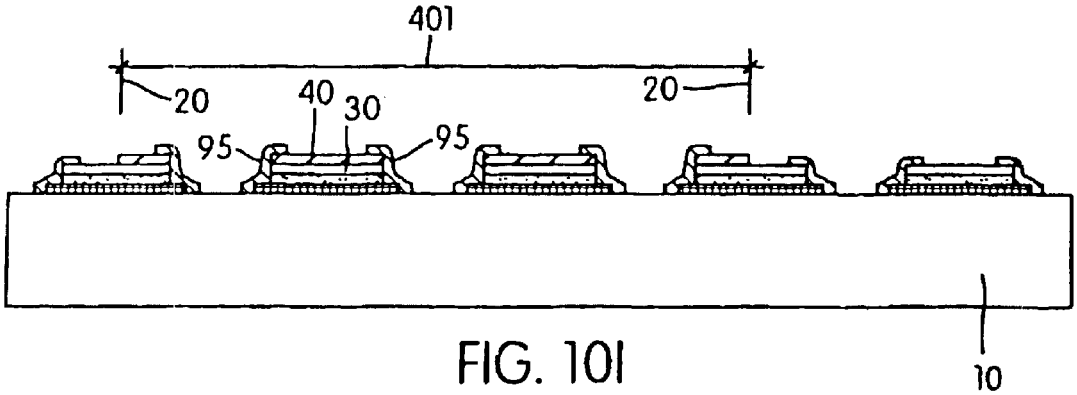

The prior art Through Combination Method has a disadvantage compared to the prior exact registration printing methods in that the perceived color width is less than the width of the silhouette pattern printed portions by the width of the overlapping black edges, typically arranged to be 4T on each side, as illustrated in FIG. 5A. In an example arrangement of the Through Combination Method, in which T is 0.075 mm, black lines of 2.4 mm width are printed at 3 mm centers, superimposed by white lines of 1.8 mm width and design color lines of 2.1 mm width, the "perceived color width" is the width of the white layer, being 1.8 mm, which provides an effective "design impact" of 60% of the panel area, compared to a silhouette pattern area of 80% of the panel area, the difference of 20% being of no value in "design impact" or visibility through the panel from the opposite side. With the present invention, for example according to FIG. 9D, if it is desired to achieve a uniform silhouette pattern, this "lost area" of black is increased. To achieve the same design impact of 60% based on a 1.8 mm control width 100, the width of the base layer 50 would need to be a control width 100 of 1.8 mm plus 12T, that is 2.7 mm. The silhouette pattern therefore would cover 90% of the panel with 2.7 mm width black lines, that is 30% instead of 20% of the overall panel area would be effectively lost with the present invention. However, the overriding advantage of the present invention in printing such panels is that multiple layers of white or white and silver layers can be used with consistent effect. In the notional arrangement of FIG. 10A, similar to FIG. 9A except for the addition of another layer 70, for example silver layer 70, the panel will always have a perceived color control width 100 with all the desired succession of layers, however much the layers are relatively displaced within the tolerance T, as illustrated in FIG. 10B. A silhouette pattern of uniform printed portion widths can be achieved by the notional arrangement of FIGS. 10D and 10F, similar to FIGS. 9D and 9F except for the addition of the silver layer 70, however much the layers are relatively displaced, for example as illustrated in FIG. 10E. Another means of achieving a silhouette pattern of uniform printed portion widths is illustrated in the notional arrangement of FIGS. 10G and 10I, similar to FIG. 9G with another layer 70, in which control layer 90 of width 901 has outer edges 2T outside the outer edges of black layer 50. This overall width 901 will be maintained with individual layers being printed by a maximum of T out of register, as illustrated in FIG. 10H. FIGS. 10C, 10F and 10I illustrate panels of the invention with printed portions according to FIGS. 10A, 10D and 10G respectively, each having design color layer 40 extending over dimension 401 between outer boundaries 20.

Figure 11A:
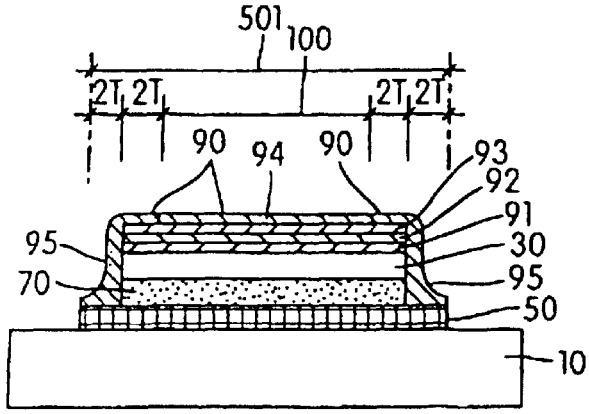
Figure 11B:
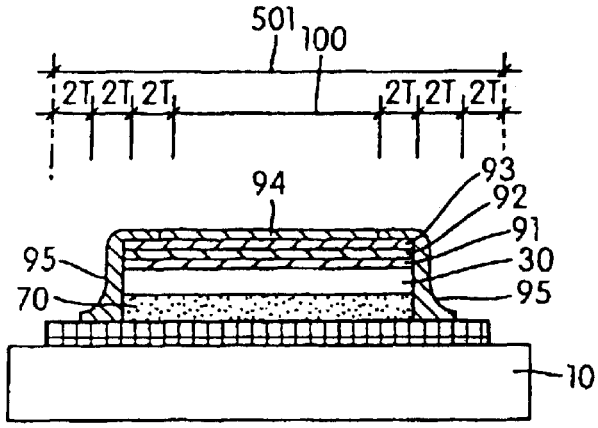

It is commonly desired in the printing of such panels to utilize a multi-colour printing process, for example the conventional "CMYK" four color printing process, in which "half-tone" dots or stochastic patterns of cyan [C], magenta [M], yellow [Y] and black [K] are printed to achieve the desired color rendering in each part of the printed panel. The CMYK colors, even the black, are typically not opaque but translucent. When superimposed on a white background layer, the eye perceives the combination of the individual color layers and the white background layer, rather than the individual CMYK colors. From a typical observation distance the eye and brain cannot resolve the individual dots. Because the CMYK ink layers are translucent, each underlying layer has a visual effect, even when viewed through an overlying layer. It is conventional to print such layers on a white background in the order CMYK. The technique of undercover removal (UCR) is used, for example to economize on the use of ink. Where an opaque black is desired, it is common to arrange for other color layers to lie beneath the black layer, for example a 50% half tone of cyan, in order to perceive a more opaque black. However, producing panels according to GB 2 165 292, for example, the edge sealing strips may be part of the black K layer in a CMYK process printed design. An independent control layer of edge sealing strips is not required. In FIG. 11A, such a K control layer 90 typically comprises two edge sealing strips 95 separated by the desired control width 100, this width typically comprising a half-tone or stochastic black K design layer 94 if required in the intended design. The edge sealing strips 95 and any K design layer 94 are printed in one "pass" of the printing press, both being integral parts of the K control layer 90. As with the use of an additional independent control layer 90, the width between the inner edges of edge sealing strips 95 controls the perceived color rendering of each printed portion. In the notional arrangement of FIG. 11A, edge sealing strips 95 within the K control layer 90 mask the edges of the C layer 91, the M layer 92, the Y layer 93, the optional silver layer 70 and the white layer 30, all these layers having their outer edges spaced 2T inside the outer edges of the underlying black layer 50. However much the individual layers are printed out of register, up the maximum tolerance T, the control width 100 will be maintained with all the required layers being superimposed across the whole of this width. Providing the maximum registration tolerance T is maintained, the K control layer 90 edge strips 95 will always mask the edges of any intervening layers between the K control layer 90 and the underlying black layer 50. As with the independent sealing strips in FIGS. 8–10, it is necessary to increase the overall width of the printed portion by 4T to guarantee a uniform width of silhouette pattern printed portions, as illustrated in the alternative notional arrangements of FIGS. 11B & 11C. While the K control layer 90 is not typically opaque, its masking effect will typically be sufficient to achieve acceptable color rendering for the purposes of most panels according to GB 2 165 292.

Thus, with the edge sealing strip method of the present invention, any number of layers of ink or other material can be superimposed of substantially the same cross-sectional width and be edge sealed, for example to mask and thus control the visual effects of lack of registration. It is possible to obtain the combined or interactive effect of any number of superimposed layers, for example silver, white and design color layers, with absolute consistency over the full control width, unlike the prior art methods of managing such lack of registration. Any desired hue, intensity and greytone can be achieved between the edge sealing strips, unlike the "Lateral Combination Method," which always exposes edge strips of white, requiring color manipulation procedures to achieved desired perceived colors and not being capable of accommodating very dark colors, including black.

Unlike the "Through Combination Method," the design color layer 40 inks need not be translucent but can be of any degree of opacity, and any number and type of layers under the control layer can be incorporated, as the controlling feature of color consistency is the gap between the edge sealing strips on each printed portion, two further major advantages of the present invention over the prior art.

Figure 12A:
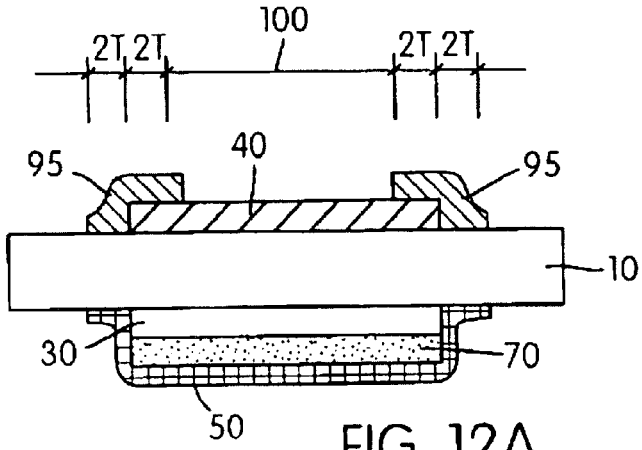
Figure 12B:
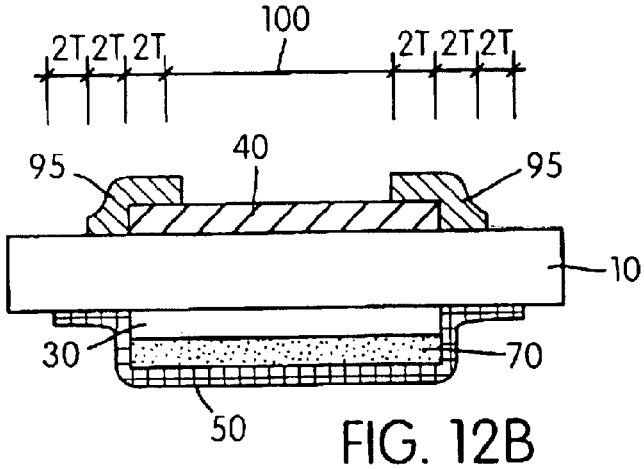
Figure 12C:
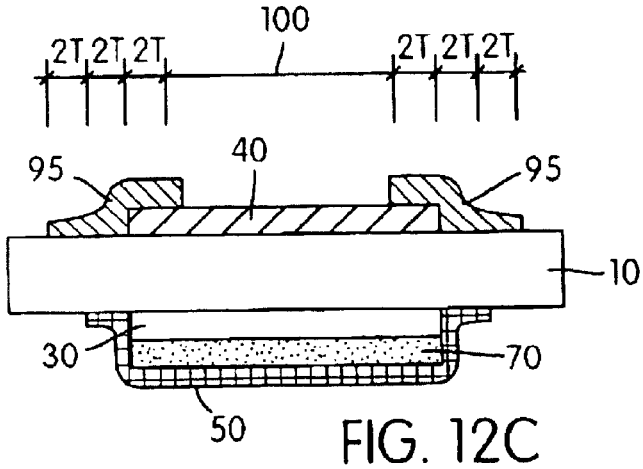

The printed layers have thus far been shown printed on one side of a substrate. However, especially with transparent substrates, there are advantages in printing one or more layers on one side of a substrate and other layers on the other side of the substrate. If the substrate is thin, for example a thin transparent film of say 100 micron thickness, the small potential for parallax error can be masked by a suitably chosen overlap of the edge sealing strips. FIG. 12A shows an example arrangement in which black layer 50, optional silver layer 70 and white layer 30 are printed on one side of a substrate that is suitable or print treated for one type of printing, for example screen printing, that is particularly good for creating mass produced opaque layers. The other side of the substrate is suitable or is print-treated for another type of printing, for example a print receptive coating for water-based inkjet inks, inkjet printing being an efficient means of one-off or short run production on such a pre-engineered substrate. FIGS. 12B and 12C show the previously explained methods of maintaining a predetermined width of printed portions, by increasing the width of layers 50 and 90 respectively. FIGS. 13A, 13B and 13C show similar panels but with multi-color process design layers, for example, the design color layers 91,92,93 and 94 form a CMYK process design and control layer 90 comprises edge sealing portions 95, as well as the black K design color layer 94.

Figure 15A:
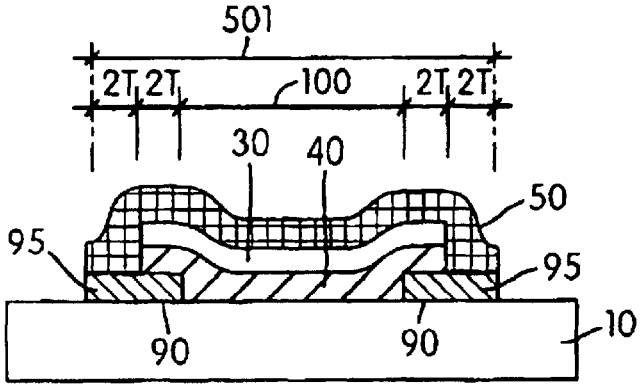
Figure 15B:
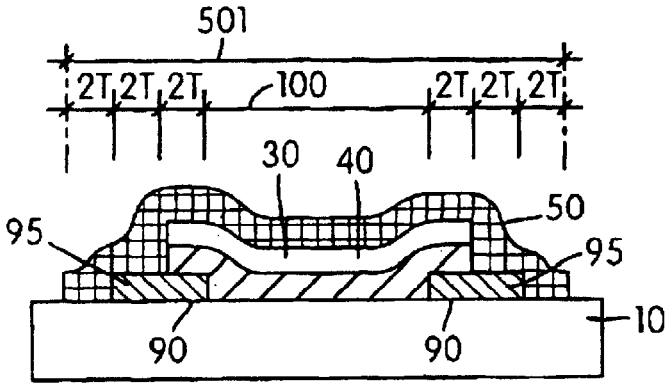
Figure 15C:
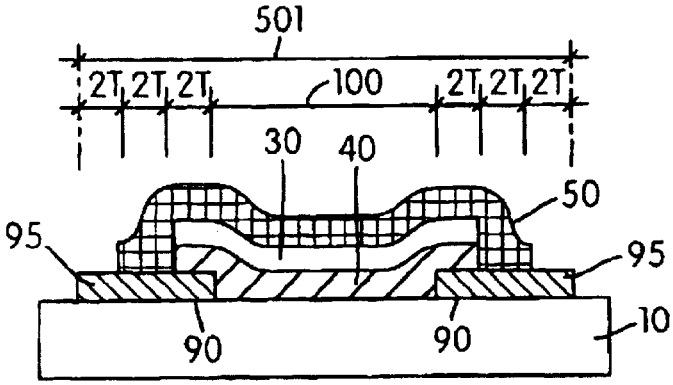
Figure 15D:
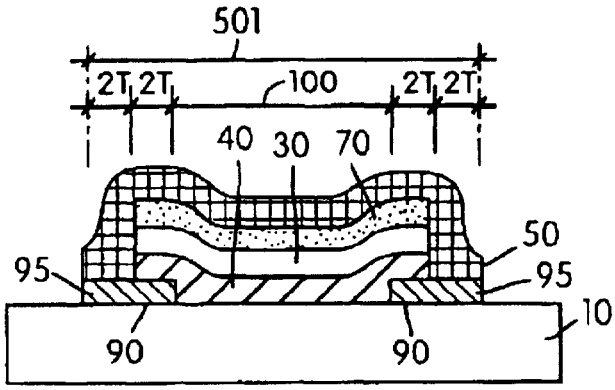
Figure 15E:
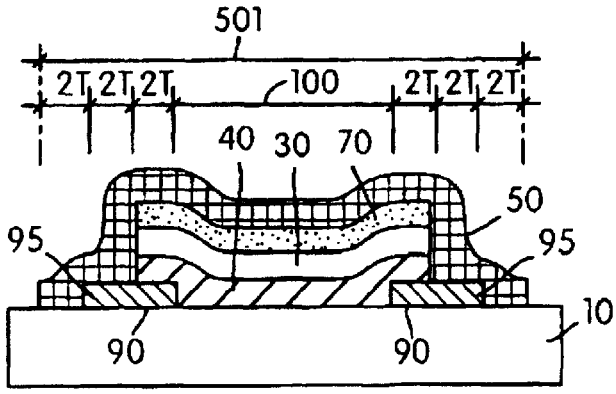
Figure 15F:
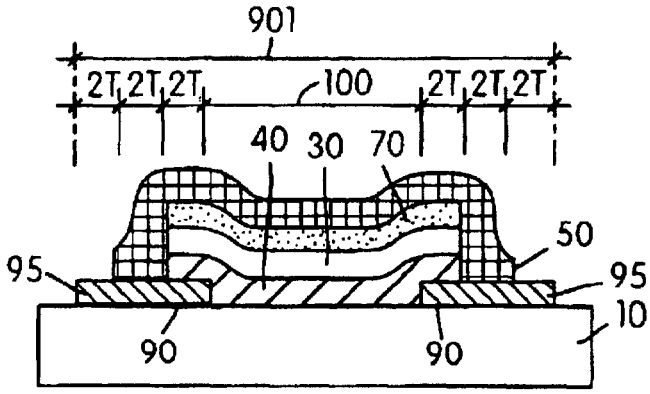
Figure 16A:
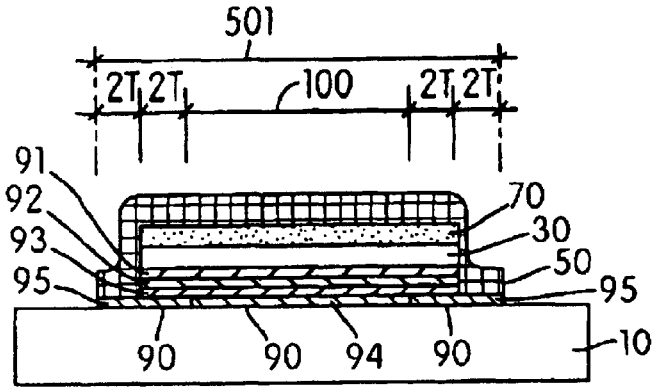
Figure 16B:
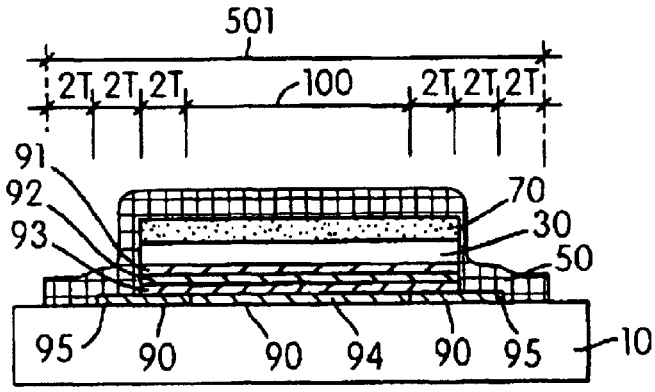

FIGS. 14 to 16 illustrate notional arrangements corresponding to FIGS. 8–11, in which the order of the layers are reversed for panels in which the design produced by the design color layer(s) is seen through the transparent base material 10. In the CMYK printing of FIGS. 16A, B and C, the design color layers are printed in reverse (KYMC) on one side of the transparent substrate 10 so the are seen in the correct order when observed through transparent substrate 10 from the other side of the panel.

Figure 14A:
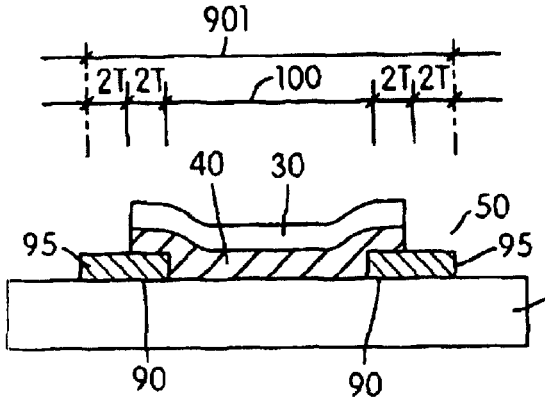
Figure 14B:
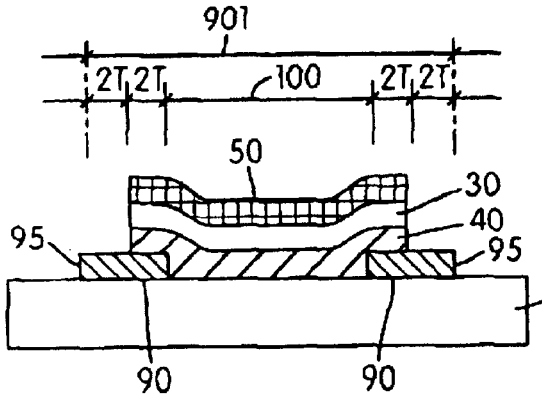
Figure 14C:
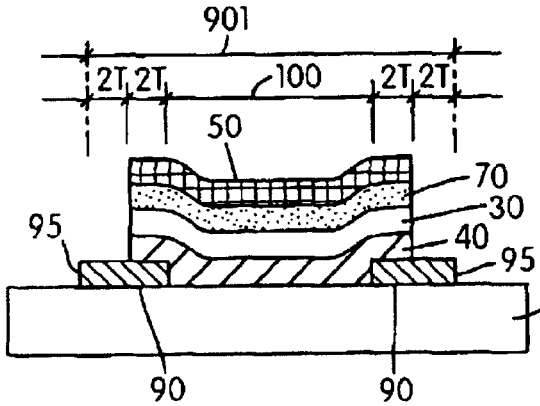
Figure 14D:
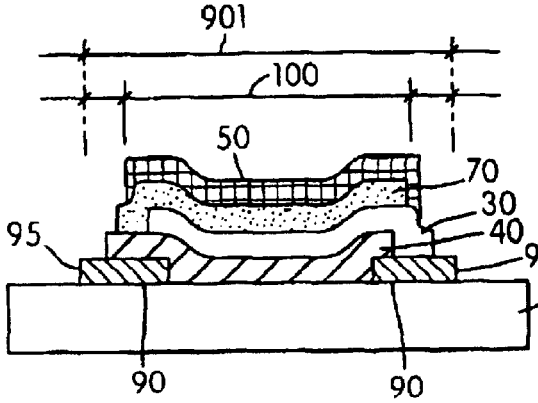
Figure 16C:
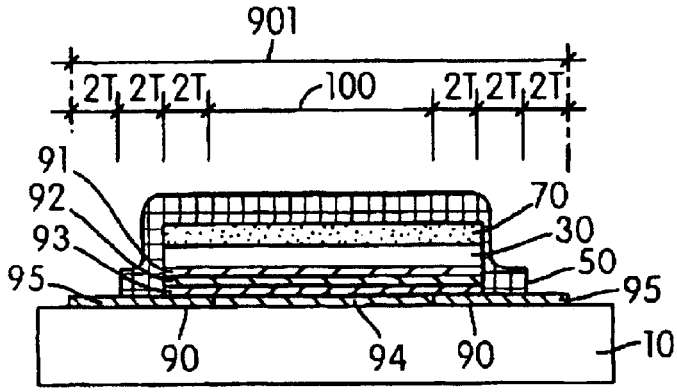

In FIGS. 14C, 15C and 16C, the outer edges of the control layer 90 notionally overlap the outer edges of the black layer 50 by 2T, in order to provide a uniform printed portion width and thereby a uniform percentage of printed pattern.

Figure 17:
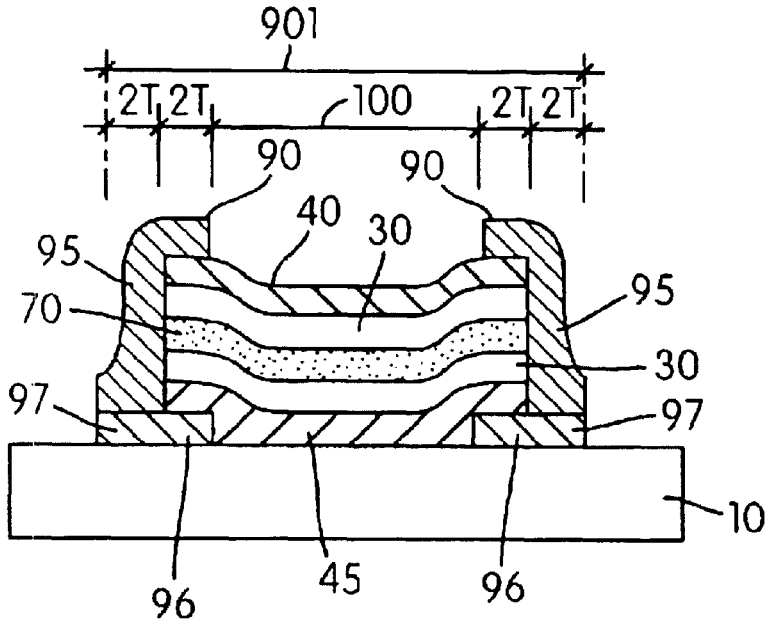

Panels of the invention, typically comprising a transparent substrate, may have one control layer on one side of each printed portion and another control layer on the other side of each printed portion. For example, FIG. 17 illustrates a notional arrangement of panels having a design visible from one side and another design visible from the other side of a partially printed panel based on a transparent substrate 10.

Figure 18:
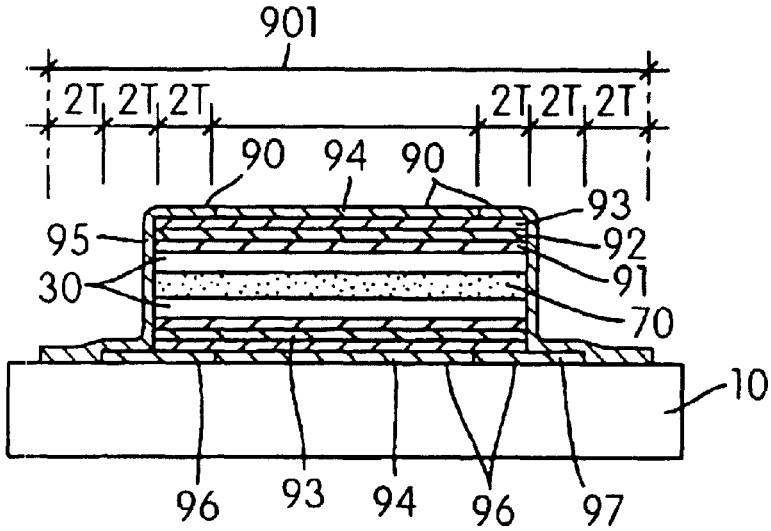

Substrate 10 is partially printed with printed portions on one side. First design color layer 40 is visible from this one side. Second design color layer 45 is visible through and from the other side of substrate 10. Second control layer 96 comprising edge sealing strips 97 is applied to transparent substrate 10. In such an arrangement, there is typically a plurality of white layers 30 between the two design color layers 40 and 45 or white layers 30 sandwiching one or more silver and/or black layers 70, in order to achieve the desired opacity of white and to avoid either design being visible from the opposite side of the panel. Control layer 90 comprising edge sealing strips 95 is applied over design color layer 40. Edge sealing strips 95 and 97 mask the outer edges of all the intervening layers. Either of the control layer widths can be made wider by 2T on each side to provide a uniform printed portion width. In FIG. 18, K control layer 90 with edge sealing strips 95 is shown a total of 4T wider than K control layer 96 with edge sealing strips 97. The arrangements of FIGS. 11C, 13C, 16C and 18 illustrate a variant of such vision control panels, in which an edge strip to a printed portion need not necessarily be opaque, for example it could comprise a single black K layer, which while not typically opaque provides an acceptable edge definition to the printed portions, enabling a functional vision control panel. A cross-section through such panels would typically comprise a plurality of alternating printed and unprinted portions, a central width of each printed portion being substantially opaque but both edges of each printed portion being translucent.

In the context of this invention, a substrate means any sheet or film material which may include any number of layers of surface coating. A transparent substrate allows an observer on one side of the substrate to focus on an object spaced from the other side of the substrate. A translucent material is one that allows light to pass through it.

Any layer of material applied to the substrate may be a multiple layer, for example the edge sealing strips may comprise two or more layers of ink or other material.

The invention includes many different embodiments and the figures are examples of these and not exhaustive. Features of one illustrated construction may be considered in conjunction with features from another figure, for example the arrangement of edge sealing in one figure may be considered in conjunction with the underlying or overlying layers from another figure.

The layers described as black layer, white layer and design color layer may comprise any color including black and white, the figures being primarily intended to disclose different constructional arrangements which enable the edge sealing of at least two layers, the outer edges of which lie within the edges of an overlying or underlying edge sealing strip.

Where reference is made in the figures or text dimensions in terms of T or a multiple of T, T is the reliably achievable registration tolerance or maximum registration error that is likely to result from a particular printing set-up, in a given direction, for example the line of a cross-section illustrated. The dimensional disclosures in terms of T are intended to enable one skilled in the art to reliably make panels according to the invention and such dimensional disclosures are not limitative any way, the invention essentially concerning the positioning of the respective layers in relation to their outer edges and, in the case of a control layer, the outer and inner edges of the edge sealing strips on a particular printed portion. The invention is not dependent on any particular quantitative dimensions. However, the invention is of most value to panels in which the cross-sectional widths of individual printed portions are small, typically less than 1 cm, more typically less than 5 mm and as small as 1 mm. The negative consequences of normal lack of registration and consequently the benefits of the invention are typically greater the smaller the cross-sectional width of any printed portion.

While the figures typically illustrate a plurality of superimposed layers that are edge sealed of notionally the same width, the width of any layer need not be the same as the width of any other layer in any particular cross-section through any printed portion.

Figure 19:
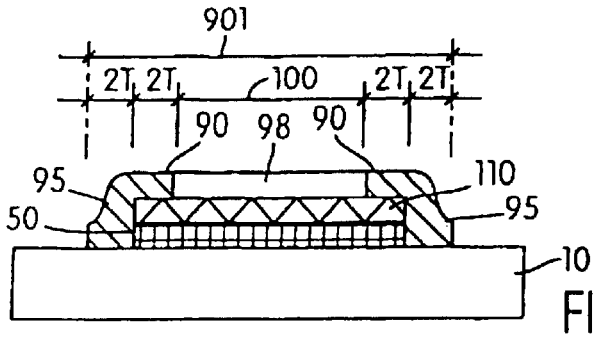
Figure 20B:
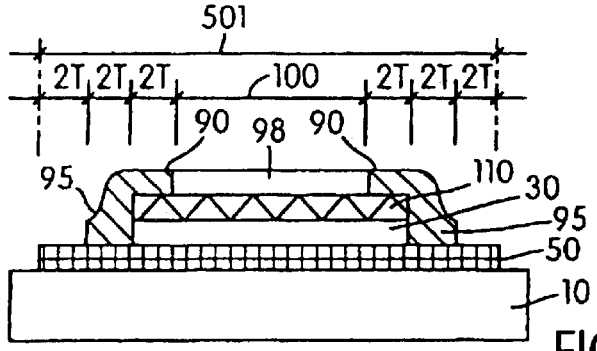
Figure 21:
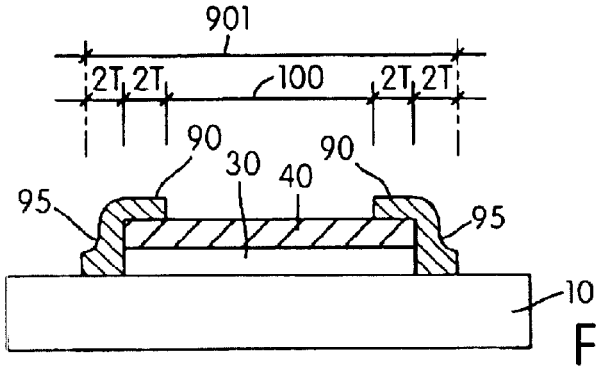
Figure 22:
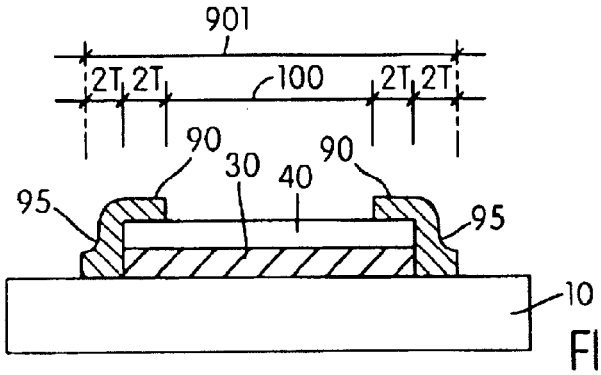
Figure 23:
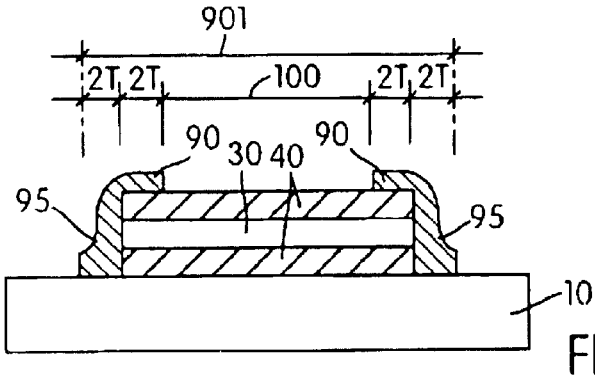
Figure 24:
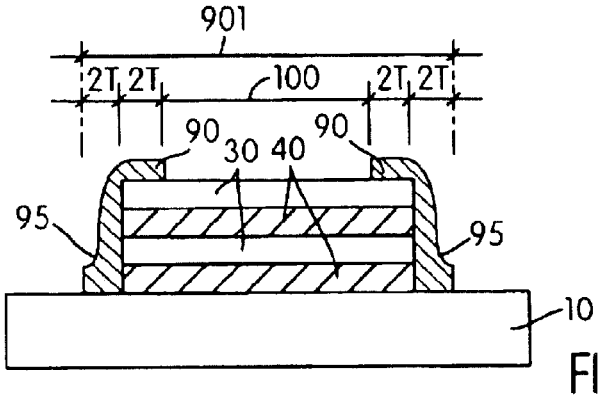
Figure 25:
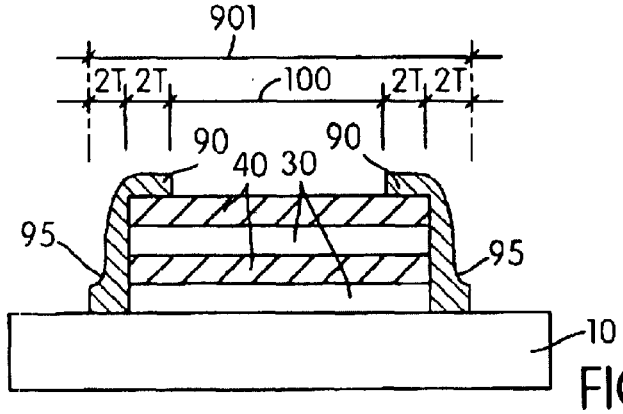
Figure 26:
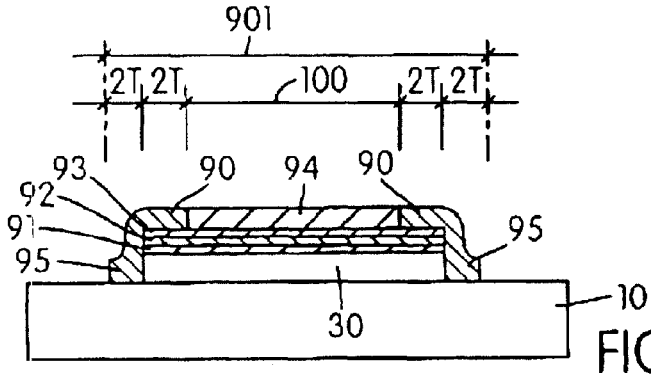
Figure 27:
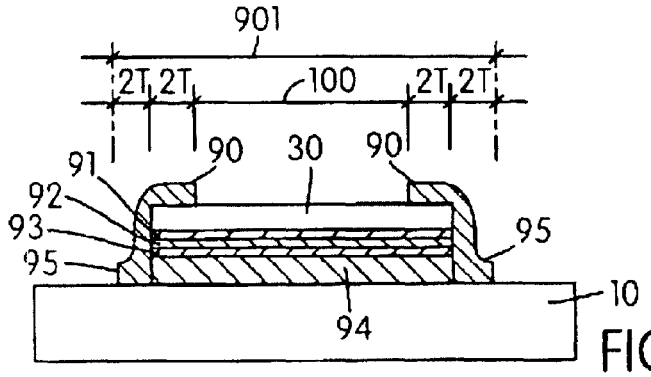
Figure 28:
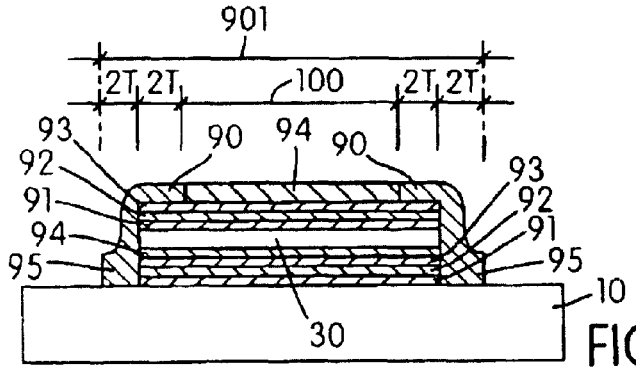
Figure 29:
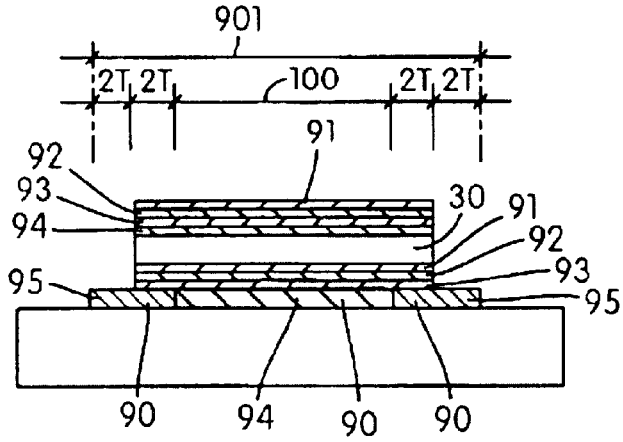
Figure 30:
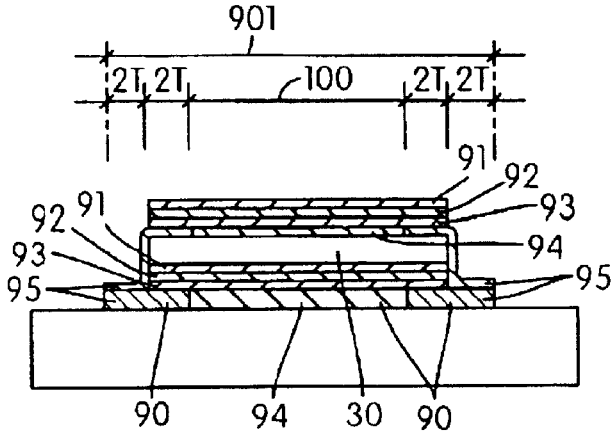
Figure 31:
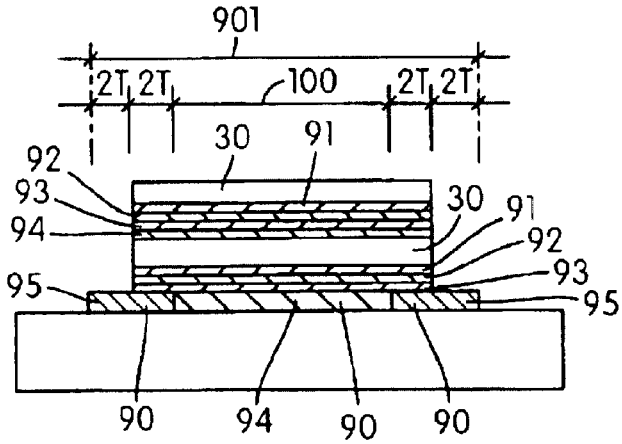

Retro-reflective inks may be incorporated into panels of the invention in a number of ways. For example, in any of the FIGS. 8A–18 having a design color layer 40, this may comprise a retro-reflective ink, typically not extending over all of the printed portions of a panel, so as to form a design which is seen by an observer to be independent of the print pattern. Alternatively, retro-reflective ink of any color may comprise a uniform retro-reflective layer 30 that extends across the control width 100. Any required design is achieved by translucent design color layer 40 or CMYK design color layers 91–94. Alternatively, as illustrated in FIG. 19, retro-reflective layer 110 (and optional base layer 50 or any succession of underlying layers on one side of the panel) is overlain by control layer 90 comprising edge sealing strips 95 and optional design mask 98 within control width 100. Design mask 98 is typically opaque, to selectively reveal retro-reflective ink layer 110, which will reflect incident light in the form of the design created by design mask 98. In the context of the invention, in this FIG. 19, retro-reflective layer 110 may be considered to be a first layer and layer 98 to a second layer. FIGS. 20A, 20B and 20C show retro-reflective layer 110 over first layer 30 on base layer 50. Such panels comprising retro-reflective material with a transparent substrate 10 may be used for traffic signs or advertisements, for example in shopping mall car parks, which will be brightly illuminated on one side by on-coming car headlights but will not obscure vision of cars, pedestrians or other objects from the other side of the panel. In FIG. 19, layers 110 and 50 may be pre-formed, for example be strips of self-adhesive retro-reflective material of any type, for example of corner cube construction. In FIGS. 20A, 20B and 20C, first layer 30 is optional and any combination of layers 110, 30 and 50 maybe pre-formed FIGS. 21 to 31 illustrate a fundamentally different type of vision control panel, according to PCT/GB97/00020 and also constructed according of the present invention. Such panels are typically used when it is required to allow natural daylighting or artificial light to pass through a panel, and to allow vision through the panels from one or both directions and for the panel to have a design which is capable of illumination, typically during the hours of darkness, typically by a spotlight directed at the back of the panel from outside a geometric projection of the panel perimeter from a viewing position in front of the panel, all as outlined in PCT/GB97/00020. PCT/GB97/00020 FIG. 1 illustrates many arrangements of panels which in cross-section comprise alternating printed portions and unprinted portions, the printed portions being transparent or translucent instead of having an opaque silhouette pattern according to GB 2 165 292. Panels according to PCT/GB97/00020 typically have a design which is visible on one side of the panel and a mirror image of the same design is visible from the other side of the panel because of the translucent nature of the printed portions. The printed portions typically incorporate a translucent white layer, in order that conventional printing inks can be used to achieve the desired color rendering of a design color layer, inks being typically formulated to be seen against a white background. All the cross-sections of the figures in PCT/GB97/00020 illustrate substantially exact registration of the superimposed layers. If it is desired to manufacture such panels using conventional printing techniques with inexact registration, an adaptation of the "Lateral Combination Method" of having transparent or translucent design color inks superimposed on a wider translucent white layer does not permit the creation of darker colors, because of the exposed edge areas of white. The "Through Combination Method" cannot be adopted, as there is not an underlying black layer to substantially obscure design color inks. If it is attempted to simply superimpose CMYK and white layers with as near exact registration as possible, the resultant registration errors would typically lead to a product with printed portions of uncontrolled width with "fuzzy," ill-defined edges and a variance of perceived color rendering. With the present invention, there is introduced a control layer comprising independent edge strips or a control layer having edge strips integral with a black control K layer in CMYK four color process or other multi-colour printing process. This provides sharp edges to printed portions, desired printed portion widths and a uniform color rendering, albeit that the edge sealing strips, typically of opaque or translucent black, would preclude the creation of panels comprising only very light colors. In FIGS. 21 to 31, the design color layers 40 are transparent or translucent, the white layer 30 is translucent and the edge sealing strips 95 are typically opaque black in an independent control layer 90 or translucent black in a K control layer 90 integral with a black K layer. With prior art panels according to PCT/GB97/00020, it is not possible to have one design visible from one side of the panel and another design visible from the other side of the panel because of the translucency of the printed pattern. The invention's provision of edge sealing strips in a control layer with the desired control width(s) in a plurality of printed portions enables the reliable control of the properties of the superimposed layers in the printed portions that would otherwise be inconsistent through conventional lack of registration. If the edge sealing strips 95 are substantially opaque, a cross-section through a panel would have alternate unprinted portions and printed portions each comprising opaque edge widths and a translucent center width.

Any printed portion that is illustrated in any of the figures or is a combination of illustrated features in any of the figures can form part of a panel with a cross-section having a plurality of printed portions in which design color layer 40 extends across each control width 100, in the manner of FIG. 8E, or design color layer 40 may only extend between two outer boundaries 20, in the manner of FIG. 8F.

The invention can be printed by any conventional printing process, including screen-printing, litho printing, gravure printing and any type of digital printing, including ink jet, electrostatic, electrostatic transfer and thermal transfer printing.

The invention may be manufactured by printing onto a substrate which forms part of a finished product. However, it is also possible to practice the invention on a decal paper or other transfer medium, from which the individual printed portions are transferred to the ultimately desired substrate. For example, a transfer medium can be electrostatically printed with cured liquid or powder toner, which is then transferred by a laminating machine to a substrate, for example a transparent PVC film, to form a panel of the invention. As another example, the invention may be practiced on conventional ceramic ink decal paper, the printed ink decal portions being subsequently transferred to a sheet of glass, then typically fused into the sheet of glass to form the desired end product.

Panels of the invention such as those in FIGS. 9G, 9I, 10G, 10I, 11C, 12C, 13C, 15C, 16C, 18 and 20C in which base layer 50 and edge sealing strips 95 are the same color, typically black, appear to be precisely printed in perfect register. The edge sealing strips masking the lack of registration in other layers that would otherwise be visible, enable printed portions of identical or otherwise consistent layout, another advantage over the prior art. When seen close to, the edge sealing strips are typically of uniform width and clearly visible, forming a recognizable regular surround to each printed portion, as illustrated in FIGS. 8G–I.

In vision control panels, edge sealing strips need not necessarily provide a "dead" visual area. For example, prior art one-way vision squash court walls are partially printed transparent substrates, typically comprising a black layer superimposed by a uniform white or other uniform colored layer, the black layer to provide good through vision for spectators and TV cameras and the relatively light layer to provide good visibility of the wall surface for players and a background against which to sight the squash ball. The development of such one-way vision materials has instigated the use in tournaments of a white squash ball in conjunction with colored background walls, instead of the traditional black squash ball and white walls, principally because a white squash ball is more visible on television. The color should not be too light, in order to provide adequate contrast with a white squash ball. Dual-tone or other multi-colored designs have also been introduced for such one-way vision squash court walls, primarily in order to enhance wall visibility. The present invention allows a consistent arrangement of exposed color layer surrounded on each printed portion by a consistent edge sealing strip, whereas the prior art methods of trying to print layers of identical geometry by conventional means or the Lateral Combination Method or the Through Combination Method will all reveal the lack of registration in the layers of individual printed portions when closely observed. Any revealed black edges will vary in thickness from point to point on such prior art panels and, in some cases, will not be visible. With the present invention, the individual edge sealing strips, typically black combined with a light design color layer in small printed portions, are not resolved by the eye of the player or spectator, resulting in the desired mixed perceived color, as well as a uniformly patterned, attractive surface when seen at close quarters. This benefit of uniform appearance of panels will apply to all types of vision control panel subject to close inspection, for example architectural privacy glazing or decorative partitions. The inevitable lack of registration of the underlying layers is masked by the uniform edge sealing strip which overlaps all other edges and forms the 'framing' of each printed portion.

It will be appreciated that the invention is completely different to the prior art method of 'trapping' with an outline, typically a black outline, the edges of abutting areas of color or the edges of four superimposed CMYK color process layers in a conventional design, for example a cartoon figure with black outlines to different color areas on a white paper substrate. In the prior art, these trapping lines follow the edges of colored areas of a design which together typically form a continuum of ink or design, rather than the partially printed portions on the substrate of the present invention. The prior art black outlines are clearly visible, indeed form a dominant feature of the overall design, for example assisting the brain to more quickly translate a two-dimensional representation into a readily perceived three dimensional object. With the present invention, the edge sealing strips, whether black or other color, do not follow the outline or internal color variations in a design but simply frame each printed portion. However, the edge sealing strips typically form a regular arrangement of quite thick lines in the foreground of visibility, unlike the underlying black edges of the prior art Lateral Combination Method and Through Combination Method and would be expected to form an easily recognizable pattern. Surprisingly, the brain is attracted to the design which is superimposed on the printed processes, not the edge sealing strips on the individual printed portions. An explanation of this surprising phenomenon may possibly be found in the field of perception, known academically as the psychology of cognitive science and neutral function, that the eye is a sensory organ and the brain interprets the resulting stimuli to make sense of these stimuli. For example, if a design is a simple two-dimensional drawing of a cube or box, this appears to be a three-dimensional cube because individuals have had extensive experience with real boxes and can interpret the three-dimensional "cues" leading to this understanding of the drawn object. Also, the most fundamental step in the complex dynamics of form perception is the almost effortless perceptual phenomenon that certain parts of any differentiated visual field stand out in a distinctive manner from other parts, known as figure-ground differentiation. In the prior art, the outline forms a dominant part of the figure, whereas in the present invention the edge sealing strips surrounding the print pattern, which may be as thick or thicker than prior art outlines, are unexpectedly not perceived but form part of the ground or background. The eye is not attracted to the edge sealing strips but to the superimposed design or color(s) they surround.

Separately, prior art outlines trap the edges of abutting layers or discontinuous superimposed multi-colore process layers, typically half-tone or stochastic discontinuous layers, whereas the present invention seals or masks the edges of at least two superimposed layers, at least one of which is continuous across each control width 100 of each printed portion in a cross-section through the panel. Additionally, there is typically no need in the prior art printing to incorporate underlying, white, silver or black layers that are not visible outside a printed design color layer.

Furthermore, in the prior art of outlines, there is no need to carefully control the dimensions of partially printed portions and thereby unprinted portions in order to control various aspects of panel performance, including the perceived color. The prior art outlines are simply to 'clean up' color zone edges and/or highlight features of a design to assist the brain's perception of the prior art design. Such prior art devices are still appropriate for designs incorporated into panels of the present invention, but such outlines would not follow the edges of the print pattern but would typically lie inside printed portions, following the external edges and possibly internal boundaries of the design, for example between different color zones. With panels of the present invention incorporating a design, an observer typically does not focus on the edge sealing portions because the brain is concentrating on more dominant stimuli. If the observer progressively moves away from the panel, there will come a point when the individual portions of the print pattern and edge sealing strips will no longer be capable of resolution but the design or second layer will still be visible.

Also, surprisingly, the introduction of the exposed edge sealing strips of a particular color, typically black, different to an exposed design color layer within the printed portions, enables rather than compromises the perception of the required design color.

Besides vision control panels, the present invention can be used for many other types of partially printed panels. Panels may be used to control the absorption and/or reflection of energy waves outside the visible spectrum. The invention may be used to modify the environmental properties of a panel. Glazing materials such as glass commonly have solar shading and solar reflection characteristics built into their construction, for example by the printing of a ceramic ink pattern or by the deposition of one or more metallic layers by "sputtering." Panels according to GB 2 165 292 are commonly used not only for their vision control performance but also for solar control in reducing solar glare, heat gain and UV radiation. According to the invention, layers can be applied to optimize on the desired reflection and/or absorption capabilities of partially printed portions of such panels. Glazing or other panels may contain electrically conductive layers, for example as heating elements or for electro-luminescent effects. The present invention allows multiple layers to be printed with inexact registration and be edge sealed, to provide consistent desired performance and appearance.

Figure 32:
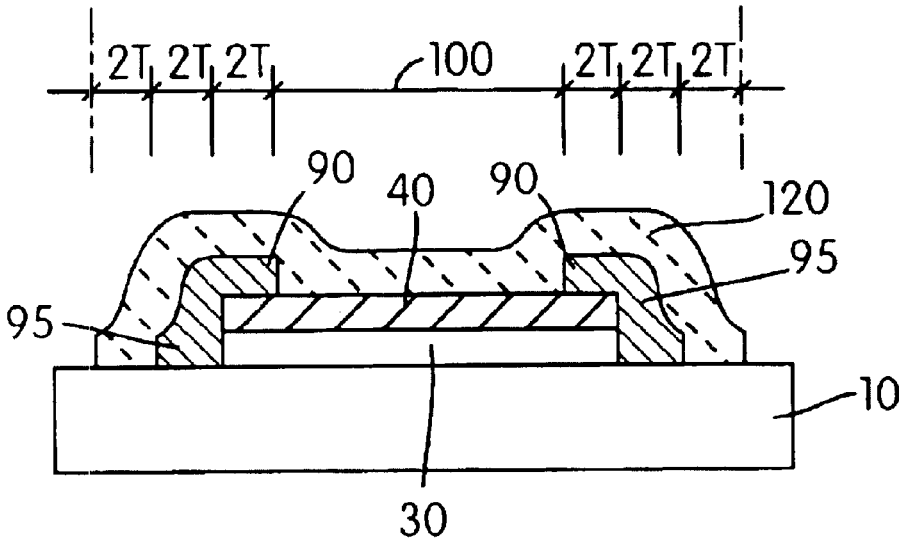

The invention can be used to control of the emission or absorption of gases, liquids or particles in suspension, such as fragrances. In such applications, the edge sealing strips may comprise actual physical fluid seals rather than just masks to visual or other forms of wave energy. Fluids may be deposited into one or more absorbed layers, the edge sealing strips retaining the fluid from sideways percolation and leakage prior to the application of a capping seal to each individual edge sealing strips or the panel as a whole. The capping seal can be printed, for example by using a cured fluid such as plastisol ink, self-adhesive film or otherwise applied film, the exposed top of the printed portions being a compatible material to assist such effective sealing. Overall capping seals can be perforated or otherwise pre-weakened in lines between individual printed portions to allow subsequent exposure of individual printed portions. In prior art so-called scratch 'n' sniff products fragrances may be released by a scratch-removable printed layer. The invention enables the individual removal of seals for fragrances, providing a more "up-market" solution than the prior art scratch'n'sniff products. In FIG. 32, absorbent first layer 30 contains a fluid and second layer 40 is a filtration and/or information layer, for example including the name of a fragrance in a half-tone layer 40. The fragrance in absorbent layer 30 is sealed by edge sealing strips 95 and sealing layer 120, which can be removed to release the fragrance.

The rate of diffusion of a fluid from an edge sealed layer through one or more covering layers is dependent mainly upon the properties of the one of more covering layers, in particular the void ratio, the form of the voids and the frictional or drag characteristics of the solid surfaces surrounding the voids. Inks typically comprise pigments, fillers and a matrix which, whether solvent or water based, will typically leave a percentage of voids in a cured ink. The solid fillers may be evenly "graded", in the same way that stone hardcore in roads may be graded, such that small solids fill the spaces between larger solids, or may be "gap-graded" to deliberately leave voids of the required range of size, for example to allow the desired passage of fluids. By controlling the nature, the permeability, the thickness and number of such layers, accurate control can be achieved over the rate of diffusion of a fluid from a printed portion, for example after a sealing layer has been removed.

Figure 33:
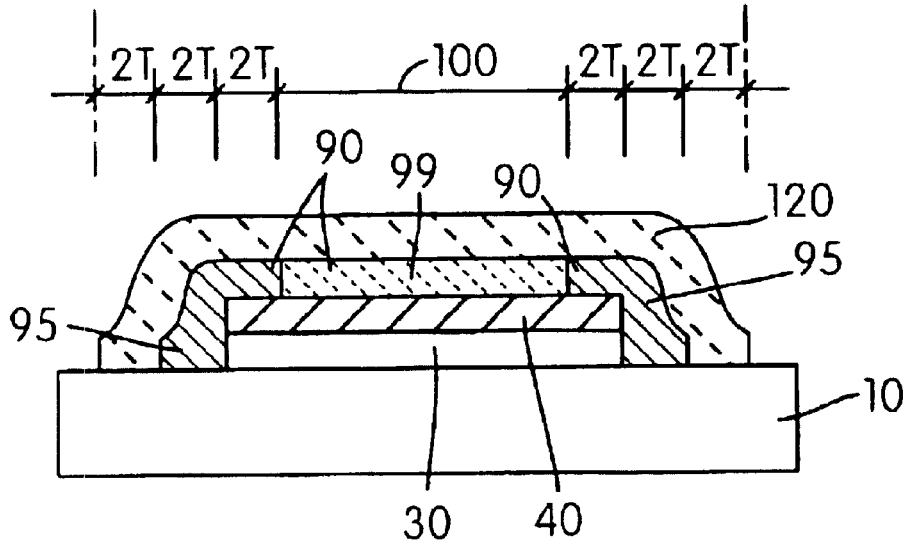

As illustrated in FIG. 33, the control layer may contain a control layer pattern 99 between the edge sealing strips 95, typically a half-tone, line or grid pattern to filter emissions or alternatively control fluids entering a printed portion. The control layer pattern 99 may vary across printed portions, for example in a vignette pattern, as a means of varying release or absorbency rates within individual printed portions. Adjacent printed portions may have different numbers of such diffusion layers, so as to further spread the rate of diffusion over an extended time period. For example, whereas perfumes or inhaled medication may require only a single construction of printed portion, as the inhalation period is typically of short duration, a skin patch according to the invention, which transmits medication, will typically have printed portions of varying numbers of layers and thereby varying rates of diffusion. Varying emission rates can be used, for example, to extend the dosage over an extended time period or to allow a standard panel of medication comprising several printed portions to be cut or torn to a size to suit the desired dosage over a desired time for a particular medical problem or to suit the age or condition of a particular patient. All of the superimposed layers to which the edge sealing strips are applied may be permeable, for example to allow the passage of air through skin patches.

Printing is a very efficient production method, for example for producing medications, especially if such medication is arranged in an array with printed instructions, for example identifying the desired day and timing of such medication. Prior art pills need separate packaging and printed instructions to provide such information.

The invention's variable multi-layer technology enables timed release of medication, using a uniform medication, rather than the differing components in prior art pills to provide for timed release of medication. The manufacturer of the medication is simplified and more economic.

Panels comprising ink with gap-graded pigments and/or filters exposed on the surface have an additional advantage of providing a degree of sound absorbency, which can be advantageous for such hard, sound-reflective surfaces such as glass.

GB 2 188 873 (Hill) discloses methods of exact registration printing and several improvements of security printing, security seals and security labels, including methods in which one or more layers of information are masked by one or more other layers. According to the present invention, edge sealing strips may be used to prevent the number or nature of superimposed layers being established by microscopic or other inspection of the exposed edges of the superimposed layers.

Another prior art security device is for a removable printed layer to obscure another printed layer, for example a scratch-removable ink layer obscuring lottery or other numbers or indication on a "scratch card." It is known that the purpose of such scratch cards as a lottery device can be fraudulently abused by an "inside operator" removing the scratch-removable ink, observing the disclosed information and reprinting scratchable ink over those scratch cards that are not "winners." Edge sealing strips 95 may be applied to scratch-removable layer such that it cannot be so easily fraudulently replaced after removal. While scratchable ink is typically a commodity material, typically colored silver, the edge sealing strips can be of virtually any type of ink and color and therefore the selection of the edge sealing ink provides an additional security device against the fraudulent exposure and subsequent recovering of lottery tickets. The edge sealing strips 95 also highlight and provide an attractive framing to the areas of interest in such lottery cards.

In another embodiment of the invention, layers of material may be visually masked in a uniformly perceived manner but change their characteristics according to ambient or historical temperature regimes, for example as used in measures to protect the safety of food. In FIG. 8A, first layer 30 is a temperature sensitive ink or other material which will change color if heated above a certain temperature. In the prior art, it is desirable for this change in color to be exposed, for example in food packaging on supermarket shelves. However, in other situations, for example in the packaging of certain expensive food stuffs such as caviar, it may be desirable that this information is provided within a security seal, to avoid the incentive for fraudulent altering or replacement of such temperature sensitive devices, which nevertheless can be exposed by food inspectors or the like. In FIG. 8A, the second layer 40 masks the temperature variable first layer 30, the edges of which are marked by edge sealing strips 95.

Such products may require an array of partially printed elements, for example which have layers that change color at different temperatures, or the invention may be used to produce elements in large quantity that are used independently of each other, for example individually printed portions used for temperature indication labels or to monitor x-rays received by the printed portion, for example when applied to a product or the skin or clothing of an individual.

A base layer 50 of a printed portion may be applied to a release surface of substrate 10 or applied to substrate 10, to enable the easy removal of individual printed portions. Such printed portions may be edible and comprise medication, for example a pill substitute, or a candy or sweet confectionery substitute, releasing a flavor at the desired rate, which can be healthier than prior art products, which are typically high in sugar and other undesirable contents.

The edge sealing strips may comprise adhesive material, for example pressure-sensitive or heat activated adhesive, to enable the printed panel to be sealed. Alternatively, the material selected for the edge sealing strips may be chosen to act as a good seal with a self-adhesive overlaminate or heat-activated sealing film. Panels may be adhered to another base material, for example vision control panels of the present invention also according to GB 2165292 or PCT/GB97/00020, produced on film materials, may be adhered to a window without affecting the optical clarity of the transparent substrate areas which are not printed. The prior art adhesive means of securing such films to windows, for example by an overall layer of pressure-sensitive adhesive between the applied film and the window, cause a reduction in clarity of through vision. The edge sealing strips may be resilient, thereby enabling each printed portion to act as a suction pad. For example, if a flexible film comprising such printed portions is "squeegeed" against a window, air is expelled from the gap between the compressible edge of each sealing strip the printed portion and the window. Upon release, after squeegeeing, the resulting partial vacuum in each printed portion causes effective adhesion of each printed portion to the window and thereby the adhesion of the overall applied film. Edge sealing strips comprising plastisol ink, for example, enable such suction pad performance of the individual printed portions.

If the control layers is exposed on the surface of a panel, the edge sealing strips project from the layer of ink beneath it, thereby providing a degree of protection against abrasion to the ink layers beneath the edge sealing strips. For example, panels of the present invention applied outside the window of a vehicle are more durable under the abrasion of automatic window wiper blades than the prior art methods in which the design forms the outer layer and is directly subject to abrasion.

In summary, the invention has very wide application within a range of partially printed products in which it is required to obscure or otherwise control the inevitable lack of registration in the production of such products.

What is claimed is:

1. A panel comprising a substantially imperforate substrate and a print pattern adhered to said substrate, said print pattern being printed onto only part of said substrate and comprising at least three layers including a first layer, a second layer, and a control layer, said first layer, said second layer, and said control layer being configured and disposed such that a cross-section taken through said panel comprises two outer edges of said substrate and alternate printed portions of said substrate and unprinted portions of said substrate, each said printed portion having two outer edges, and wherein within said cross-section of said panel each of a plurality of said printed portions being constructed and arranged such that they each include a part of said first layer and a part of said second layer and a part of said control layer, said plurality of said printed portions each including two outer edges of said part of said first layer and two outer edges of said part of said second layer and two outer edges of said part of said control layer, and wherein within each of said plurality of said printed portions said part of said second layer is located between said part of said first layer and said part of said control layer, and wherein the width between said two outer edges of each of said plurality of said printed portions is less than one centimeter, and wherein said part of said control layer comprises two edge sealing strips and each of said two edge sealing strips comprises one of said two outer edges of said part of said control layer and an inner edge, and wherein one of said two outer edges of said part of said first layer and one of said two outer edges of said part of said second layer are positioned within said outer and inner edges of one of said two edge sealing strips and the other of said two outer edges of said part of said first layer and the other of said two outer edges of said part of said second layer are positioned within said outer and inner edges of the other of said two edge sealing strips.

2. A panel as claimed in claim 1, wherein said print pattern comprises a base layer, and wherein each of said plurality of said printed portions includes a part of said base layer having two outer edges, said part of said base layer being located on the side of said part of said first layer remote from said part of said control layer.

3. A panel as claimed in claim 2, wherein the width between said two outer edges of said base layer is not less than both the width between said two outer edges of said part of said first layer and the width between said two outer edges of said part of said second layer.

4. A panel as claimed in claim 2, wherein the width between said two outer edges of said base layer is greater than *both* the width between said two outer edges of said [each of said plurality of said printed portions] *part of said first layer and the width between said two outer edges of said part of said second layer*.

5. A panel as claimed in claim 1, wherein the width between said two outer edges of each of said plurality of said printed portions is less than 5 mm.

6. A panel as claimed in claim 1, wherein the width between said two outer edges of each of said plurality of said printed portions is not greater than 2.7 mm.

*7. A panel as claimed in claim 1, wherein said substantially imperforate substrate is transparent.*

*8. A panel as claimed in claim 7, wherein the second layer is a design color layer and is seen through the transparent substrate.*

*9. A panel comprising:*

*a substantially imperforate substrate; and*

*a print pattern disposed on said substrate, said print pattern being disposed on only part of said substrate and comprising at least three layers including a first layer, a second layer, and a control layer,*

*wherein said first layer, said second layer, and said control layer are configured and disposed such that at least one cross-section taken through said panel comprises*

*two outer edges of said substrate, and*

*alternate printed portions of said substrate and unprinted portions of said substrate,*

*wherein a plurality of said printed portions are constructed and arranged such that each of said plurality of said printed portions include*

*two outer edges, a width between said two outer edges being less than one centimeter,*

*a part of said first layer having two outer edges,*

*a part of said second layer having two outer edges, and*

*a part of said control layer having two outer edges, wherein said part of said control layer comprises two edge sealing strips, wherein each edge sealing strip comprises one of said two outer edges of said part of said control layer, wherein each edge sealing strip has an inner edge, wherein each said part of said control layer has a control width between said inner edges of said two edge sealing strips,*

*wherein one of said two outer edges of said part of said first layer is located within said outer and inner edges of one of said two edge sealing strips, and the other of said two outer edges of said part of said first layer is located within said outer and inner edges of the other of said two edge sealing strips,*

*wherein said two outer edges of said layer are located within said two outer edges of said part of said control layer, and*

*wherein said part of said second layer is located between said part of said first layer and said part of said control layer.*

*10. A panel as claimed in claim 9, wherein said first layer is white.*

*11. A panel as claimed in claim 9, wherein said first layer is black.*

*12. A panel as claimed in claim 9, wherein said first layer is black and said second layer is white.*

*13. A panel as claimed in claim 9, wherein said second layer is design color layer other than white.*

*14. A panel as claimed in claim 13, wherein said second layer is a multi-color design color layer comprising a plurality of individual colors and wherein one of said individual colors is discontinuous within said control width.*

*15. A panel as claimed in claim 14, wherein said multi-color design color layer is a four color process layer comprising individual colors of cyan, magenta, yellow and black.*

*16. A panel in claim 15, wherein said control layer is said black four color process layer.*

*17. A panel as claimed in claim 9, wherein said control layer is black.*

*18. A panel as claimed in claim 9, wherein in at least one of said plurality of said printed portions, one of said two outer edges of said part of said second layer is within said outer and inner edges of said one of said two edge sealing*

*strips, and the other of said two outer edges of said part of said second layer is within said outer and inner edges of said other of said two edge sealing strips.*

*19. A panel as claimed in claim 9, wherein said first layer is of one color and said second layer is of another color, and said parts of said first and said second layers are continuous across said control width.*

*20. A panel as claimed in claim 9, wherein said print pattern comprises a base layer, and wherein each of said plurality of said printed portions includes a part of said base layer having two outer edges, said part of said base layer being located on the side of said part of said first layer remote from said part of said control layer.*

*21. A panel as claimed in claim 20, wherein said print pattern comprises another layer, and wherein each of said plurality of said printed portions includes a part of said another layer having two outer edges, and wherein said part of said another layer is located between said part of said first layer and said part of said base layer.*

*22. A panel as claimed in claim 21, wherein said another layer is silver.*

*23. A panel as claimed in claim 20, wherein a width between said two outer edges of said base layer is at least as wide as both a width between said two outer edges of said part of said first layer and a width between said two outer edges of said part of said second layer.*

*24. A panel as claim in claim 20, wherein a width between said two outer edges of said base layer is greater than both a width between said two outer edges of said part of said first layer and a width between said two outer edges of said part of said second layer.*

*25. A panel as claimed in claim 9, wherein the width between said two outer edges of each of said plurality of said printed portions is less than 5 mm.*

*26. A panel as claimed in claim 9, wherein the width between said two outer edges of each of said plurality of said printed portions is not greater than 2.7 mm.*

*27. A panel as claimed in claim 9, wherein said substantially imperforate substrate is transparent.*

*28. A panel as claimed in claim 9, wherein said second layer comprises a retro-reflective material.*

*29. A panel as claimed in claim 9, wherein said first layer comprises a retro-reflective material.*

*30. A panel as claimed in claim 9, wherein said transparent substrate comprises two sides, and wherein said first layer is applied to one side of said transparent substrate and said second layer and said control layer are applied to the other side of said transparent substrate.*

*31. A panel as claimed in claim 9, wherein both said first layer and said second layer are translucent.*

*32. A panel as claimed in claim 9, wherein said print pattern comprises a pattern of discrete lines.*

*33. A panel as claimed in claim 9, wherein said edge sealing strips comprise fluid seals.*

*34. A panel as claimed in claim 33, wherein said first layer is absorbent, and wherein said second layer is one of a filtration layer and an information layer, and wherein a sealing layer is applied onto said control layer.*

*35. A panel comprising a substantially imperforate substrate, and a print pattern disposed on said substrate, said print pattern comprising a first layer, a second layer, and a control layer, said layers being disposed such that at least one cross-section taken through said panel comprises:*

*two outer edges of said substrate, and*

*a plurality of printed portions, the printed portions being separated by unprinted portions of said substrate, a width of each of said plurality of printed portions being less than one centimeter,*

*wherein some of said plurality of printed portions each comprise*

*at least a part of said first layer, said part of said first layer comprising first and second edges,*

*at least a part of said second layer, said part of said second layer comprising third and fourth edges, and*

*at least a part of said control layer, said part of said control layer comprising first and second edge sealing strips, wherein said first edge sealing strip one of overlaps and underlaps said first and third edges, wherein said second edge sealing strip one of overlaps and underlaps said second and fourth edges, and wherein said first and second edge sealing strips are spaced from each other.*

*36. The panel of claim 35, wherein the control layer further comprises one of a half-tone and a stochastic black layer, and wherein said some of said plurality of printed portions each comprise at least a part of the one of a half-tone and a stochastic black layer that extends between the first and second edge sealing strips.*

*37. A panel as claimed in claim 35, wherein said substantially imperforate substrate is transparent.*

*38. A panel as claimed in claim 37, wherein the second layer is a design color layer and is seen through the transparent substrate.*

* * * * *